United States Patent
Sun et al.

(10) Patent No.: US 12,426,094 B2
(45) Date of Patent: Sep. 23, 2025

(54) COMMUNICATION CONFIGURATION BASED ON RANDOM ACCESS BANDWIDTH

(71) Applicant: QUALCOMM Incorporated, San Diego, CA (US)

(72) Inventors: Jing Sun, San Diego, CA (US); Xiaoxia Zhang, San Diego, CA (US); Changlong Xu, Beijing (CN); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 17/914,891

(22) PCT Filed: Apr. 10, 2020

(86) PCT No.: PCT/CN2020/084133
§ 371 (c)(1),
(2) Date: Sep. 27, 2022

(87) PCT Pub. No.: WO2021/203402
PCT Pub. Date: Oct. 14, 2021

(65) Prior Publication Data
US 2023/0136223 A1    May 4, 2023

(51) Int. Cl.
*H04W 74/0833*    (2024.01)
(52) U.S. Cl.
CPC .............................. *H04W 74/0833* (2013.01)
(58) Field of Classification Search
CPC ............. H04W 74/0833; H04W 16/14; H04W 72/0457; H04W 72/231
See application file for complete search history.

(56) References Cited

U.S. PATENT DOCUMENTS

| | | | |
|---|---|---|---|
| 2011/0038354 A1* | 2/2011 | Akimoto | H04L 5/0023 370/335 |
| 2013/0070725 A1* | 3/2013 | Wang | H04W 72/0453 370/336 |

(Continued)

FOREIGN PATENT DOCUMENTS

| | | |
|---|---|---|
| CN | 110300455 A | 10/2019 |
| WO | 2014112912 A1 | 7/2014 |

(Continued)

OTHER PUBLICATIONS

Huawei, et al., "Configuration of Coverage Enhancement during Initial Access", 3GPP TSG RAN WG1 Meeting #80, R1-150035, Athens, Greece, Feb. 9-13, 2015, 7 Pages.

(Continued)

*Primary Examiner* — Christine Ng
(74) *Attorney, Agent, or Firm* — Loza & Loza LLP

(57) ABSTRACT

A communication configuration is selected based on the bandwidth used by a wireless communication device during a random access procedure (e.g., on an unlicensed band). In some scenarios, the maximum transmit power that the wireless communication device can use may be significantly restricted (e.g., by a regulation). In some cases (e.g., when the wireless communication device is near a center of a cell), the wireless communication device may transmit the random access information using a default bandwidth. In other cases (e.g., when the wireless communication device is near a cell edge), the wireless communication device may transmit the random access information using a wider bandwidth (e.g., to increase the coverage of the transmission). In some aspects, the maximum bandwidth used for the random access procedure may be used to select at least one communication configuration that is used for a subsequent communication (e.g., data or control signaling).

36 Claims, 13 Drawing Sheets

(56) References Cited

U.S. PATENT DOCUMENTS

| | | | |
|---|---|---|---|
| 2013/0242777 A1* | 9/2013 | Choi | H04W 72/0446 |
| | | | 370/336 |
| 2016/0291130 A1 | 10/2016 | Ginsburg et al. | |
| 2016/0295609 A1 | 10/2016 | Vajapeyam et al. | |
| 2018/0069593 A1* | 3/2018 | Yi | H04L 5/003 |
| 2018/0310341 A1 | 10/2018 | Yerramalli et al. | |
| 2018/0367262 A1* | 12/2018 | Hwang | H04L 1/1861 |
| 2019/0045506 A1* | 2/2019 | Takeda | H04W 48/12 |
| 2019/0104554 A1* | 4/2019 | Amuru | H04W 74/0833 |
| 2019/0116614 A1* | 4/2019 | Li | H04W 76/27 |
| 2019/0132882 A1* | 5/2019 | Li | H04L 27/2605 |
| 2019/0342874 A1 | 11/2019 | Davydov et al. | |
| 2019/0356524 A1* | 11/2019 | Yi | H04B 7/0617 |
| 2020/0059345 A1* | 2/2020 | Pelletier | H04B 7/00 |
| 2020/0221488 A1* | 7/2020 | Li | H04L 5/0053 |
| 2020/0266959 A1* | 8/2020 | Yi | H04W 72/044 |
| 2020/0344761 A1* | 10/2020 | Amuru | H04L 27/2607 |
| 2022/0225407 A1* | 7/2022 | Wang | H04L 5/0094 |
| 2023/0129299 A1* | 4/2023 | Ohara | H04W 74/0866 |
| | | | 370/329 |

FOREIGN PATENT DOCUMENTS

| | | |
|---|---|---|
| WO | 2016065640 A1 | 5/2016 |
| WO | 2019074338 A1 | 4/2019 |
| WO | 2019160481 A1 | 8/2019 |
| WO | 2019193422 A2 | 10/2019 |
| WO | 2019196066 A1 | 10/2019 |
| WO | 2020009498 A1 | 1/2020 |
| WO | 2020034550 A1 | 2/2020 |

OTHER PUBLICATIONS

International Search Report and Written Opinion—PCT/CN2020/084133—ISA/EPO—Dec. 30, 2020.
Supplementary European Search Report—EP20930098—Search Authority—The Hague—Nov. 3, 2023.
Nokia, et al., "Initial Access Signals and Channels for NR-U", 3GPP TSG RAN WG1 Meeting #AH-1901, R1-1900347, Taipei, Taiwan, Jan. 21-25, 2019, 26 Pages, Fig. 4, Chapters 1, 2.2, 2.4 and 3.
Taiwan Search Report—TW110103469—TIPO—Sep. 11, 2024.

* cited by examiner

COMMUNICATION CONFIGURATION BASED ON RANDOM ACCESS BANDWIDTH

CROSS-REFERENCE TO RELATED APPLICATION(S)

This application is the U.S. national stage of PCT patent application number PCT/CN2020/084133 filed on Apr. 10, 2020.

INTRODUCTION

The technology discussed below relates generally to wireless communication, and more particularly but not exclusively, to techniques for selecting a communication configuration based on the bandwidth used in a random access procedure.

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS.

As the demand for mobile broadband access continues to increase, research and development continue to advance communication technologies, including technologies for enhancing communication within a wireless network in particular, not only to meet the growing demand for mobile broadband access, but to advance and enhance the user experience with mobile communications.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to selecting a communication configuration based on the bandwidth used by a wireless communication device during a random access procedure (e.g., a physical random access channel (PRACH) procedure). In some examples, the wireless communication device may conduct a random access procedure to a BS via a shared radiofrequency (RF) spectrum such as an unlicensed band. Here, the maximum transmit power that the wireless communication device is allowed to use may be restricted (e.g., by a regulation). In some cases (e.g., when the wireless communication device is near a center of a cell), the wireless communication device may transmit random access information using a default bandwidth. In other cases (e.g., when the wireless communication device is near a cell edge), the wireless communication device may transmit random access information using a wider bandwidth (e.g., to increase the coverage of the transmission).

In some aspects, the maximum bandwidth used for the random access procedure may be used to select at least one communication configuration that is used for a subsequent communication (e.g., communication of control and/or data). To this end, the BS may indicate that different communication configurations are to be used depending on the random access bandwidth. After determining the bandwidth used for the random access procedure, the BS and the wireless communication device may therefore select the specified communication configuration (e.g., a bandwidth used for communicating control or data) for the subsequent communication. This configuration may be referred to as an initial configuration for the subsequent communication since this is the first configuration that used for the subsequent communication after the random access procedure. For example, the first time the wireless communication device attempts to transmit uplink information after completing a PRACH procedure, the wireless communication device may use the same bandwidth (e.g., a wider bandwidth than the default bandwidth) that the wireless communication device used to successfully access the BS during the PRACH procedure. Thus, in this example, the initial configuration for the uplink transmission (e.g., the default bandwidth to be used for the first uplink transmission after the PRACH) is based on the bandwidth used during the PRACH procedure.

In some examples, a method of wireless communication at a wireless communication device may include performing a physical random access channel (PRACH) procedure; identifying a first bandwidth used for the PRACH procedure; selecting at least one initial communication configuration based on the first bandwidth used for the PRACH procedure; and communicating with another device. In some aspects, the communicating may use the at least one initial communication configuration.

In some examples, a wireless communication device may include a transceiver, a memory, and a processor communicatively coupled to the transceiver and the memory. The processor and the memory may be configured to perform a physical random access channel (PRACH) procedure; identify a first bandwidth used for the PRACH procedure; select at least one initial communication configuration based on the first bandwidth used for the PRACH procedure; and communicate with another device via the transceiver. In some aspects, the communication with the other device may use the at least one initial communication configuration.

In some examples, a wireless communication device may include means for performing a physical random access channel (PRACH) procedure; means for identifying a first bandwidth used for the PRACH procedure; means for selecting at least one initial communication configuration based on the first bandwidth used for the PRACH procedure; and means for communicating with another device. In some aspects, the communicating may use the at least one initial communication configuration.

In some examples, an article of manufacture for use by a wireless communication device includes a computer-readable medium having stored therein instructions executable by one or more processors of the wireless communication device to perform a physical random access channel (PRACH) procedure; identify a first bandwidth used for the PRACH procedure; select at least one initial communication configuration based on the first bandwidth used for the PRACH procedure; and communicate with another device. In some aspects, the communication with the other device may use the at least one initial communication configuration.

In some examples, a method of wireless communication at a base station may include receiving at least one physical random access channel (PRACH) sequence; identifying a first bandwidth used for receiving the at least one PRACH sequence; determining at least one initial communication configuration based on the first bandwidth used for receiving the at least one PRACH sequence; and communicating with a wireless communication device. In some aspects, the communicating may use the at least one initial communication configuration.

In some examples, a base station may include a transceiver, a memory, and a processor communicatively coupled to the transceiver and the memory. The processor and the memory may be configured to receive at least one physical random access channel (PRACH) sequence via the transceiver; identify a first bandwidth used for receiving the at least one PRACH sequence; determine at least one initial communication configuration based on the first bandwidth used for receiving the at least one PRACH sequence; and communicate with a wireless communication device via the transceiver. In some aspects, the communication with the wireless communication device may use the at least one initial communication configuration.

In some examples, a base station may include means for receiving at least one physical random access channel (PRACH) sequence; means for identifying a first bandwidth used for receiving the at least one PRACH sequence; means for determining at least one initial communication configuration based on the first bandwidth used for receiving the at least one PRACH sequence; and means for communicating with a wireless communication device. In some aspects, the communicating may use the at least one initial communication configuration.

In some examples, an article of manufacture for use by a base station includes a computer-readable medium having stored therein instructions executable by one or more processors of the base station to receive at least one physical random access channel (PRACH) sequence; identify a first bandwidth used for receiving the at least one PRACH sequence; determine at least one initial communication configuration based on the first bandwidth used for receiving the at least one PRACH sequence; and communicate with a wireless communication device. In some aspects, the communication with the wireless communication device may use the at least one initial communication configuration.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

I. WIRELESS COMMUNICATION PLATFORM

Figure 1:
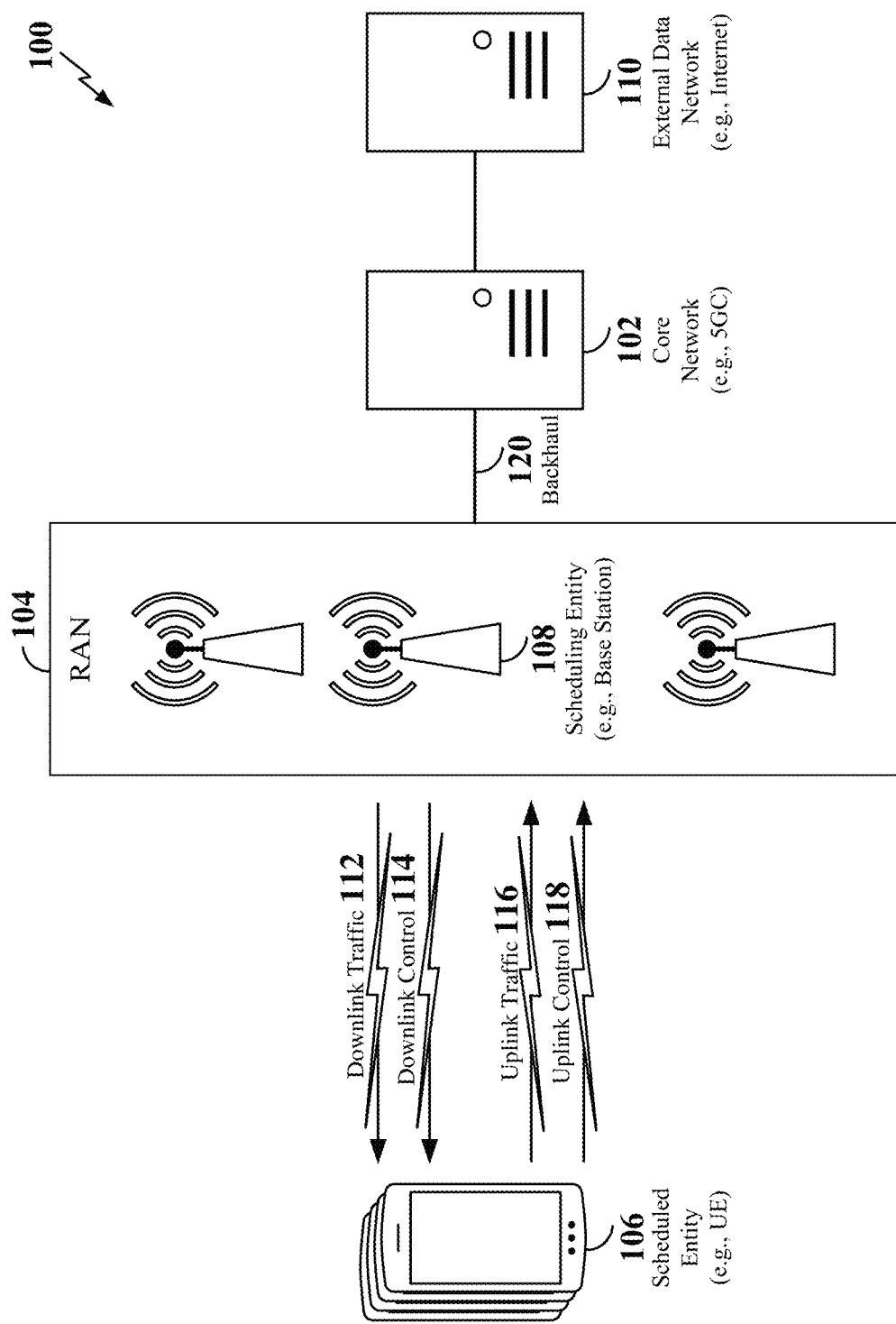
FIG. 1 is a schematic illustration of a wireless communication system according to some aspects of the disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
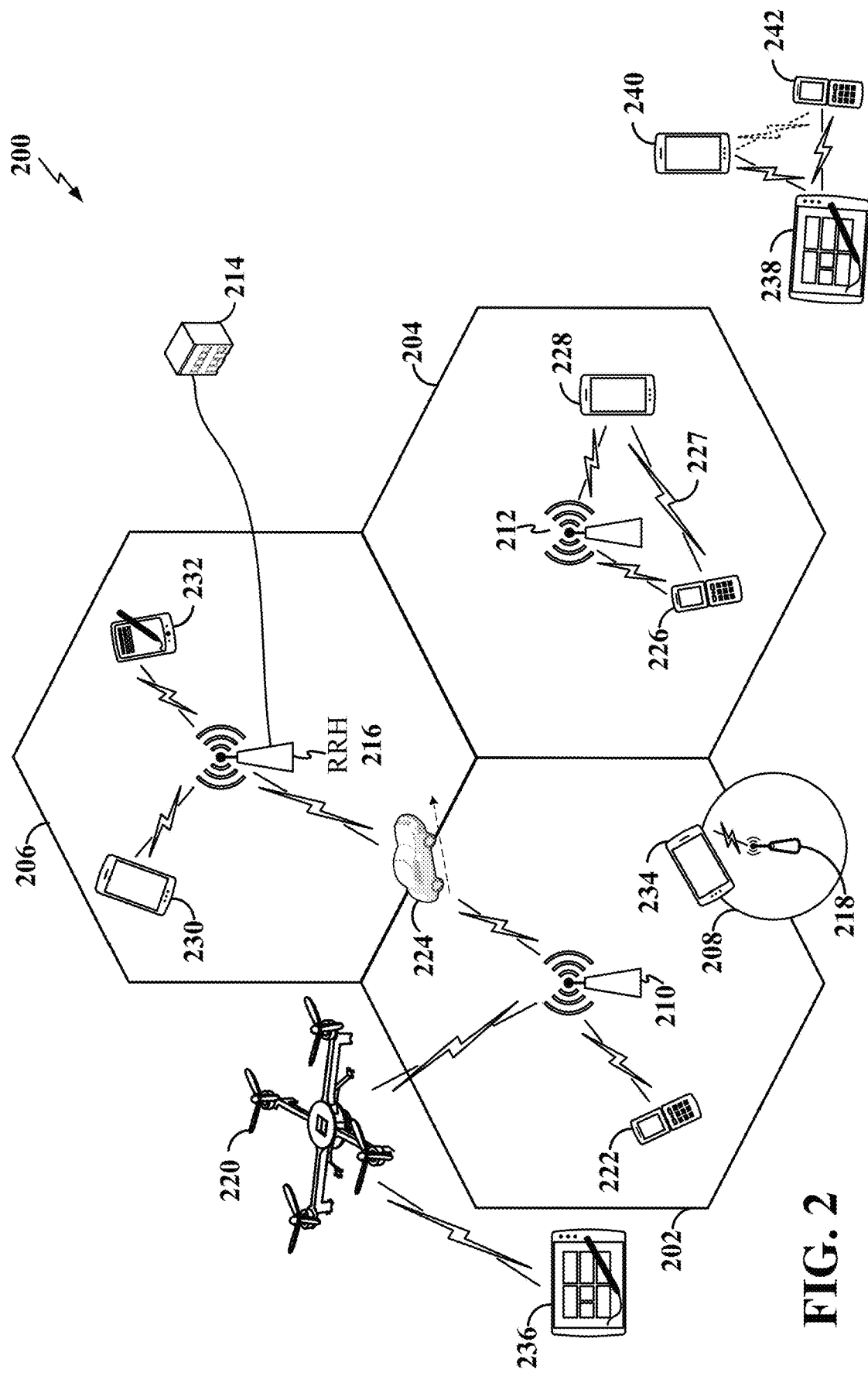
FIG. 2 is a conceptual illustration of an example of a radio access network according to some aspects of the disclosure.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancelation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
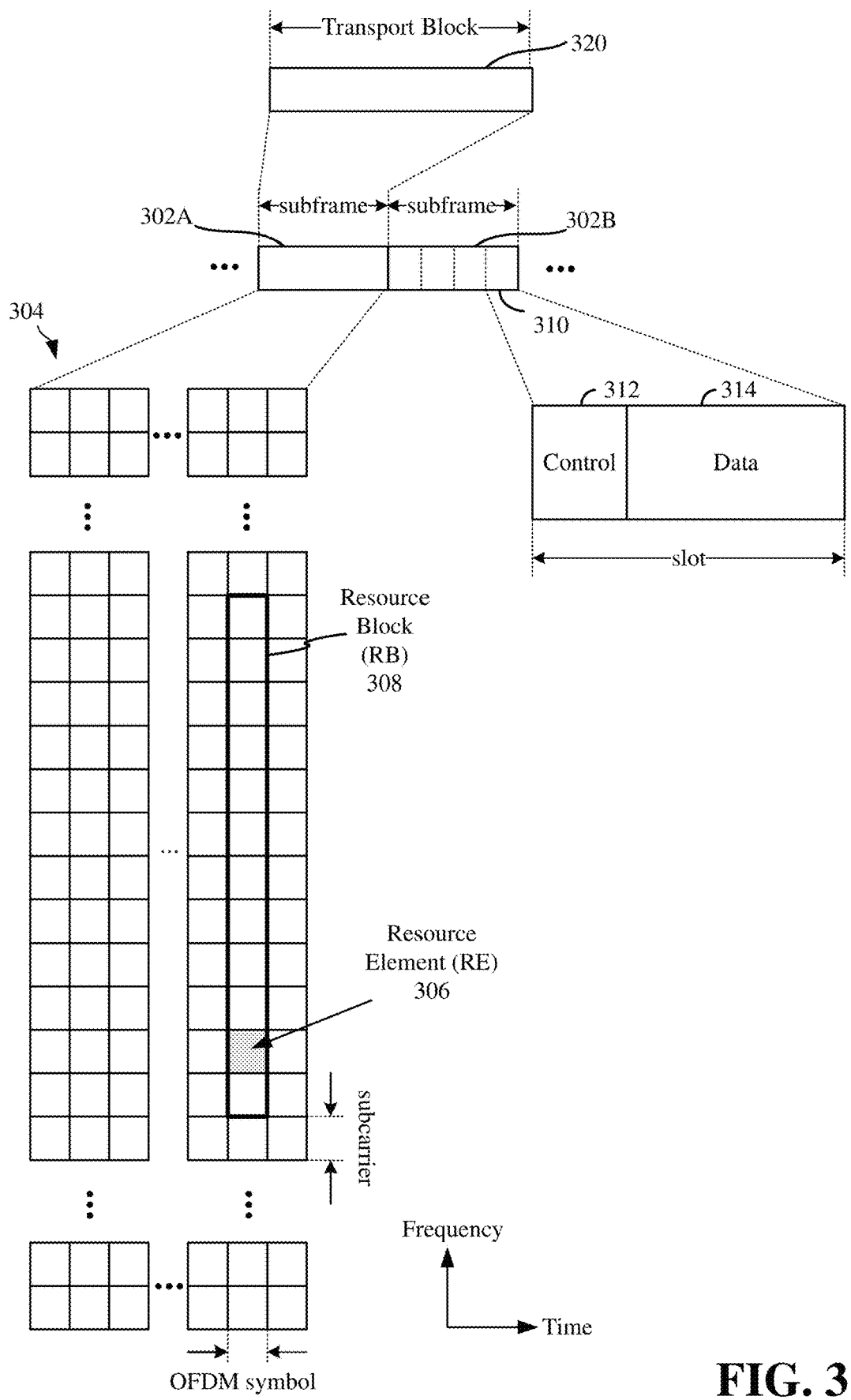
FIG. 3 is a schematic illustration of wireless resources in an air interface utilizing orthogonal frequency divisional multiplexing (OFDM) according to some aspects of the disclosure.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more bandwidth parts (BWPs), where each BWP includes two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The SSB may be used to send system information (SI) and/or provide a reference to SI transmitted via another channel. Examples of system information may include, but are not limited to, subcarrier spacing, system frame number, a cell global identifier (CGI), a cell bar indication, a list of common control resource sets (coresets), a list of common search spaces, a search space for SIB1, a paging search space, a random access search space, and uplink configuration information. Two specific examples of coresets include PDCCH Coreset 0 and Coreset 1.

The SI may be subdivided into three sets referred to as minimum SI (MSI), remaining MSI (RMSI), and other SI (OSI). The PBCH may carry the MSI and some of the RMSI. For example, the PBCH may carry a master information block (MIB) that includes various types of system information, along with parameters for decoding a system information block (SIB). In some example, the MIB may configure Coreset 0.

The RMSI may include, for example, a SystemInformationType1 (SIB1) that contains various additional system information. The RMSI may be carried by a PDSCH (e.g., at a dedicated Coreset 0).

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Further, the physical channels described above are generally multiplexed and mapped to transport channels for handling at the medium access control (MAC) layer. Transport channels carry blocks of information called transport blocks (TB), which were mentioned above. As an illustration, an exemplary MAC layer transport block 320 is shown mapped to subframe 302 in FIG. 3, but is not limited to such mapping and this is only for illustration purposes to demonstrate a certain mapping. The transport block size (TBS), which may correspond to a number of bits of information, can be a controlled parameter based on the modulation and coding scheme (MCS) and the number of RBs in a given transmission.

II. EXAMPLES FOR COMMUNICATION CONFIGURATION BASED ON RANDOM ACCESS BANDWIDTH

As discussed above, a network may use unlicensed radio frequency (RF) spectrum in some scenarios. For example, a network operator may deploy cells that are configured to communicate on an unlicensed RF spectrum (e.g., in addition to cells operating on a licensed RF spectrum) to extend the coverage of the network or to provide additional services (e.g., higher throughput) to UEs operating within the network.

In some scenarios, devices that transmit over unlicensed RF spectrum may use a collision avoidance scheme to reduce the possibility that multiple devices will transmit on the same band at the same time. One example of such a collision avoidance scheme is a listen-before-talk (LBT) procedure. In general, before a first device transmits on a resource, the first device may listen for transmissions by another device. If the resource is currently being used, the first device may back-off for a period of time and then re-attempt transmission (e.g., by listening for other transmissions again). Carrier sense multiple access (CSMA) is one example of an LBT procedure. Other types of LBT procedures may be used as well.

NR operation in the unlicensed RF spectrum may be referred to as NR-U. Under NR-U, some transmissions may be subject to LBT. For example, under NR-U, a gNB's transmission of discovery reference signals (DRSs) such as the SSB discussed above may be subject to LBT.

For example, a wireless device, such as a user equipment (UE) or a base station, may perform a clear channel assessment (CCA), such as listen-before-talk (LBT), prior to gaining control of a wireless channel in an unlicensed band. In some examples, a base station may gain access to the wireless channel and transmit a synchronization signal block (SSB), such as during a discovery reference signal (DRS)

slot. The SSB may carry synchronization signals and reference signals for a UE to discover and synchronize with the base station.

A BS may schedule uplink transmissions for UEs, specifying which time-domain and frequency-domain resources each UE is to use for its respective uplink transmission. For UL transmissions on an unlicensed RF spectrum, interlaced-based scheduling may be used in the frequency domain. For example, in NR-U, a PRB interlaced waveform may be used in the UL to satisfy occupied channel bandwidth (OCB) goals and/or to boost UL transmit power for a given power spectral density (PSD) limitation.

A BS may schedule a UE to transmit according to one of more of the interlaces. For example, a BS may schedule a first UE to transmit on interlace 0 and schedule a second UE to transmit on interlace 1. As another example, a BS may schedule a first UE to transmit on interlace 0 and interlace 1. Other examples are possible.

Figure 4:
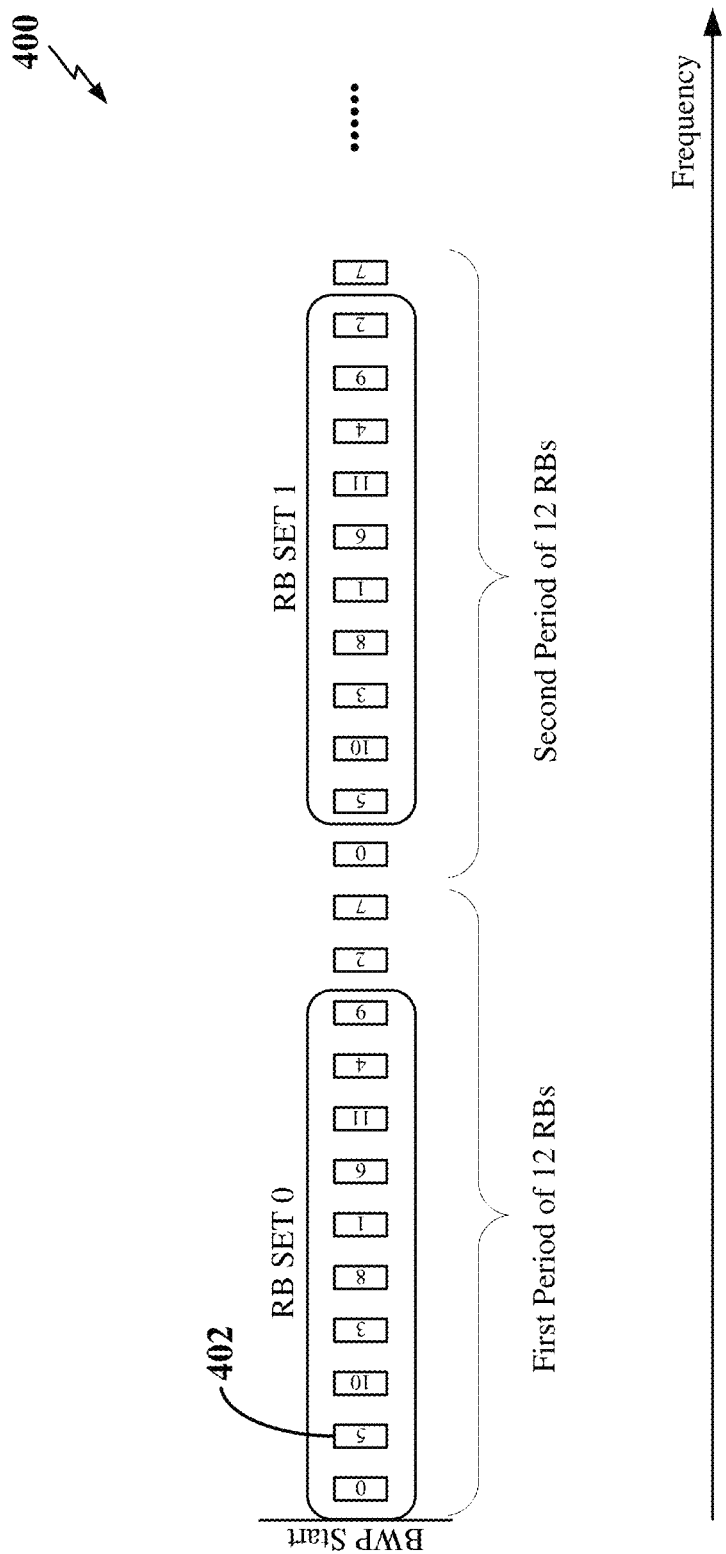
FIG. 4 is a conceptual illustration of an example of resources on an uplink interlace according to some aspects of the disclosure.

FIG. 4 illustrates an example of an UL interlace 400 (e.g., for NR-U). A given interlace may correspond to a set of frequency resources. For example, each block (e.g., block 402) in FIG. 4 may correspond to a resource block. FIG. 4 also illustrates that different sets of RBs (e.g., RB set 0 and RB set 1, etc.) may be defined with respect to an interlace. Here, each RB set includes ten RBs of the interlace. A different number of RBs per RB set may be used in other examples.

Wireless communication operations in certain frequency bands may be subject to regulatory restrictions (e.g., FCC regulation). For example, Table 1 describes an example of a 6 GHz band. This band is currently used, for example, for microwave communication, backhaul communication, and video camera communication.

TABLE 1

| BAND | FROM (MHz) | To (MHz) | BANDWIDTH (MHz) |
|---|---|---|---|
| U-NII-5 | 5925 | 6425 | 500 |
| U-NII-6 | 6425 | 6525 | 100 |
| U-NII-7 | 6525 | 6875 | 350 |
| U-NII-8 | 6875 | 7125 | 250 |

Devices communicating on the 6 GHz band might not use spectrum sharing techniques. Consequently, maximum transmit power on this band may be limited to, for example, 5 decibel-milliwatts/MHz (dBm/MHz) for a gNB and −1 dBm/MHz for a UE. This is to protect incumbent users of this band (e.g., video cameras).

In the above examples, use of the 6 GHz band (e.g., U-NII-5 and U-NII-7) may be subject to a transmit power limit that is lower than the transmit power limit imposed on other bands. For example, maximum transmit power on a 5 GHz band may be limited to, for example, 10 dBm/MHz for a gNB and 10 dBm/MHz for a UE.

Given that the power spectral density (PSD) limitation on the 6 GHz band is substantially lower than on the 5 GHz band, the total transmit power allowed may be limited by bandwidth occupied. Moreover, in 3GPP Rel. 16 NR-U, PRACH is limited to a 20 MHz band.

Given the relatively low PSD limitation on the 6 GHz band (e.g., 11 dB lower at the UE side and 5 dB lower at the gNB side), the link budget may be reduced. The disclosure relates in some aspects to regaining this loss of link budget. Also, as indicated above, the uplink may be weaker (e.g., by 6 dB relatively). The disclosure relates in some aspects to balancing the link budget between the downlink and the uplink.

PRACH is the first uplink transmission waveform. If PRACH does not have enough link budget, the UE cannot access the system. In 3GPP Rel. 16 NR-U, to have higher PRACH power under a PSD limitation, the PRACH design is revised by introducing a sequence of length 571 for 30 KHz and a sequence of length 1151 for 15 KHz. These sequences occupy about 48/96 RBs for 30 KHz/15 KHz respectively.

The disclosure relates in some aspects to increasing the effective transmit power by transmitting signals with a wider bandwidth (e.g., without making the sequence longer). As mentioned above, the 3GPP Rel. 16 NR-U PRACH covers 20 MHz. This may be relatively low given the low PSD limitation. The disclosure thus relates in some aspects to a wider band PRACH. For example, as shown in Table 2, for a UE, an increase of 3 dBm may be achieved using a 40 MHz bandwidth instead of a 20 MHz bandwidth. In addition, an increase of 6 dBm may be achieved using an 80 MHz bandwidth instead of a 20 MHz bandwidth.

TABLE 2

|  | 20 MHz | 40 MHz | 80 MHz |
|---|---|---|---|
| UE | 12 dBm | 15 dBm | 18 dBm |
| gNB | 18 dBm | 21 dBm | 24 dBm |

Figure 5:
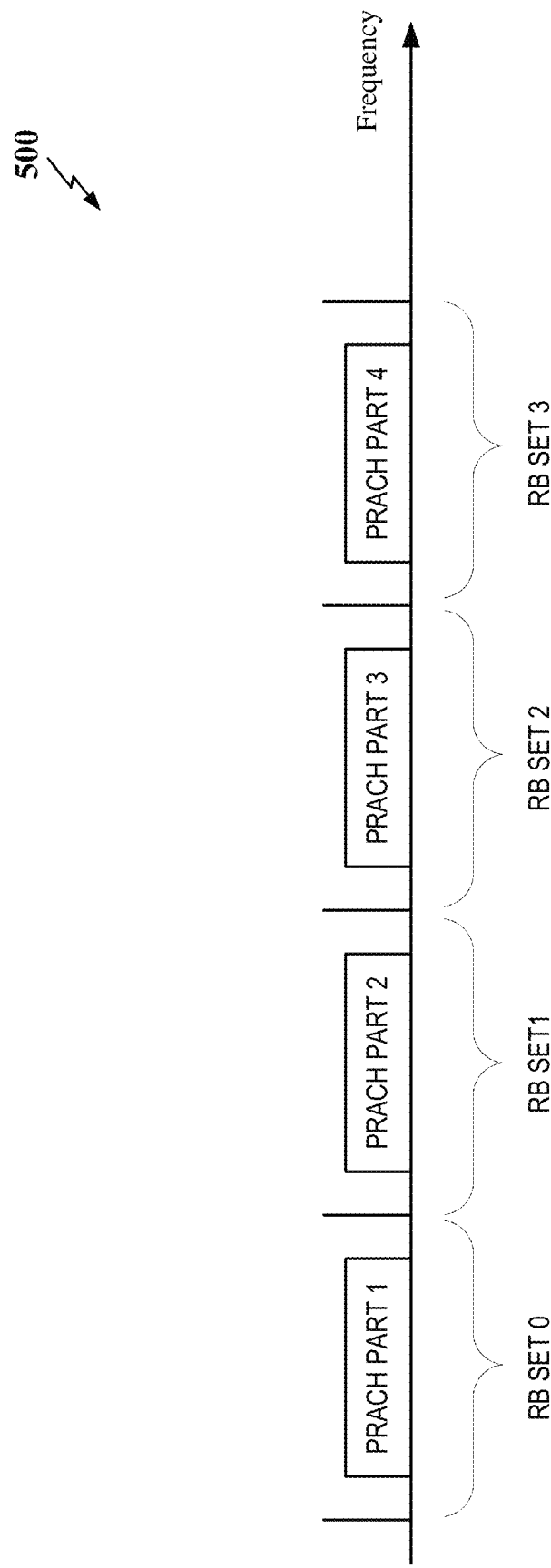
FIG. 5 is a conceptual illustration of an example of random access information sent via multiple RB sets according to some aspects of the disclosure.

FIG. 5 illustrates an example of a repeated wideband PRACH waveform 500. A first PRACH part may be sent on RB set 0, a second PRACH part may be sent on RB set 1, and so on. As mentioned above, each RB set may have a 20 MHz bandwidth. Each repetition of the PRACH waveform may occupy 48 or 96 RBs out of the 20 MHz in some examples.

NR systems may use a power ramping process for initial access PRACH transmission. Starting with the open loop power control, a UE picks an initial power level for the first PRACH transmission. After each transmission, the UE will wait for a msg2 from the gNB. If a msg2 is not received within a random access response (RAR) window, the UE may assume that the PRACH power is not high enough to reach the gNB. The UE may therefore send another PRACH at a higher (e.g., slightly higher) power level.

The disclosure relates in some aspects to using a wider band PRACH to provide additional power for the PRACH power ramping process. For example, use of wider band PRACH transmissions may be integrated into the power ramping process.

In some examples, if the open loop transmit power is low, the UE can start with a single PRACH transmission. If, after a few PRACH transmissions (e.g., with the transmit power increasing with each transmission), the required PRACH transmit power exceeds the power that can be supported by single PRACH, the UE may transmit multiple PRACH sequences in an FDM fashion.

Figure 6:
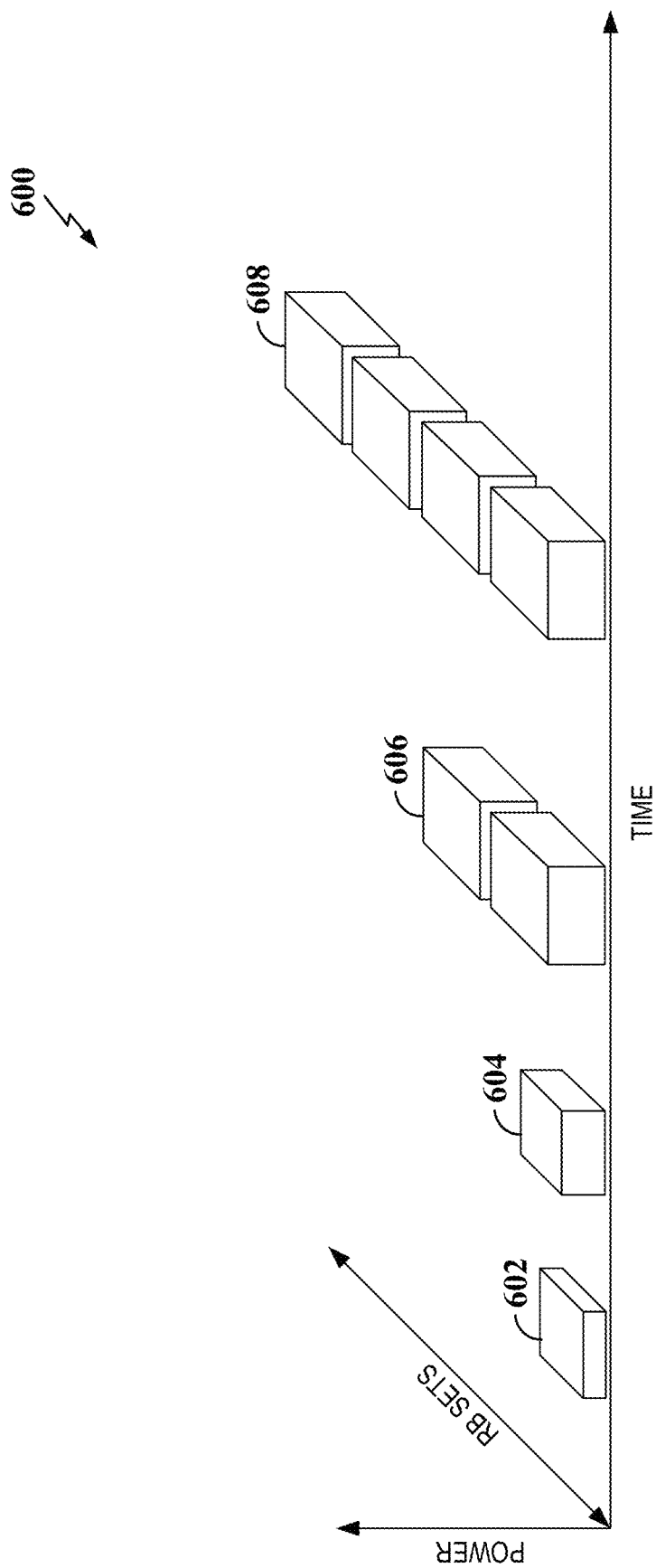
FIG. 6 is a conceptual illustration of an example of a power ramping process according to some aspects of the disclosure.

FIG. 6 illustrates an example of this type of power ramping 600, where the different rows of blocks represent different PRACH transmissions. Initially, a PRACH 602 is transmitted at a certain transmit power on one RB set. Having not received msg2, a PRACH 604 may be transmitted at a higher transmit power on one RB set. Having still not received msg2, PRACHs (e.g., PRACH 606) may be transmitted at a still higher transmit power (e.g., the highest allowed transmit power) on two RB sets. Finally, if msg2 is still not received, PRACHs (e.g., PRACH 608) may transmitted on four RB sets. In some examples, the blocks in a given row in FIG. 6 (e.g., the third row including the PRACH 606 or the fourth row including the PRACH 608) may represent that the same amount of power and RBs are used for each RB set transmission.

In some examples, multiple PRACH transmissions may be integrated earlier into the power ramping process. Initially, if the open loop transmit power is low, the UE can start with single PRACH transmission. If msg2 is not received, the process can start using multiple PRACH transmissions (e.g., two RB sets) before the maximum transmit power limit is reached. Here, the UE can increase the transmit power and/or the number of frequency division multiplexed PRACH sequences as a power ramping technique.

The disclosure relates in some aspects to selecting at least one communication configuration based on the bandwidth used in a PRACH procedure. For example, if a wider bandwidth used for PRACH to close the link for msg1, a wider bandwidth (e.g., to provide more power) and/or other communication configuration may be used for other signaling to close the link for that signaling as well. On the other hand, if the UE is close to its serving gNB, a smaller transmission bandwidth (power) may be sufficient to close the link. In this case, it may be preferable from a system efficiency standpoint to not use a wider initial BWP (e.g., to not exclusively use the wider BWP). For example, a gNB may have a lower chance to access the channel if the gNB is required to pass LBT on all parts of the bandwidth (e.g., on all sub-bands).

The disclosure thus relates in some aspects to dynamically supporting, for example, cell center UEs and cell edge UEs at the same time. From an initial access point of view, since the PRACH procedure is performed first, the PRACH bandwidth used may indicate a good starting point to pick the bandwidth (e.g., power) and/or other communication parameter(s) used for subsequent signaling.

The disclosure relates in some aspects to improving the link budget when such a UE is under a PSD limitation. In some aspects, this may involve using different configurations to support different coverage enhancement techniques. In some aspects, the coverage enhancement techniques may involve increasing the transmission bandwidth of signals and/or channels. For example, a gNB may support different initial DL/UL BWP configurations and default PUCCH configurations, where the default configuration used for an initial communication that follows the PRACH procedure may depend on the PRACH bandwidth the UE successfully used to access the gNB. Several specific examples of communication configurations follow. Other examples are possible.

In some examples, the bandwidth used for sending uplink control information may be selected based on the bandwidth used for a PRACH transmission. A BS may allocate a bandwidth that a UE is allowed to use for an uplink transmission. For example, the BS may allocate one bandwidth (e.g., a BWP of a particular width) for PRACH transmissions, another bandwidth for PUCCH transmissions, and so on. A UE may use one or more sub-bands (e.g., RB sets) of the allocated bandwidth for transmitting uplink control information to a BS on a band that may have a limited PSD. Here, a sub-band is a proper subset of the total bandwidth allocated by the BS for the transmission. That is, there is more than one sub-band defined within the total bandwidth allocated by the BS for the transmission. For example, when the UE is at or near the center of a cell of the BS, the UE may be able to transmit the uplink control information via a single sub-band and still close a link with the BS. Conversely, when the UE is at or near an edge of the cell, the UE may need to transmit the uplink control information via multiple sub-bands to close a link with the BS. As a specific example, the total allocated bandwidth (e.g., a frequency band) may be subdivided into four sub-bands. Thus, in different examples a UE could transmit on one sub-band of the total allocated bandwidth, on two sub-bands of the total allocated bandwidth, on three sub-bands of the total allocated bandwidth, or on four sub-bands of the total allocated bandwidth. To this end, the BS may schedule multiple sub-bands for an uplink transmission by the wireless communication device and monitor each of these sub-bands (e.g., RB sets) for uplink control information (e.g., since the BS might not know beforehand how many sub-bands the UE will ultimately use). In such a scenario, the initial number of sub-bands selected by the UE for an uplink transmission may be based on the bandwidth (e.g., the number of sub-bands) that the UE successfully used to close a link to the BS during the PRACH procedure. For example, a default bandwidth for PUCCH (e.g., 20 MHz) may be selected if a UE used a default bandwidth PRACH (e.g., 20 MHz). Conversely, a wider band PUCCH (e.g., greater than 20 MHz) may be selected if the UE used a wider band PRACH (e.g., greater than 20 MHz).

In some examples, the bandwidth of an initial DL/UL BWP may be selected based on the bandwidth used for a PRACH transmission. Here, the RMSI may include multiple configurations for the initial DL/UL BWP. Other ways of signaling the configurations could be used as well. Each initial DL/UL BWP configuration may include, for example, a common PDSCH/PUSCH configuration, a common PUCCH configuration, other configurations, or any combination thereof. The common PDSCH/PUSCH configuration may include, for example, different configurations to support different coverage enhancement techniques. For example, the coverage enhancement techniques may include TBS scaling techniques. The common PUCCH configuration may include, for example, a default PUCCH configuration.

The bandwidth of an initial DL/UL BWP to be used for a particular UL or DL communication may be based on the bandwidth (e.g., the number of sub-bands) that the UE used to close a link to the BS during the PRACH procedure. For example, a default bandwidth (e.g., 20 MHz) may be selected for the initial DL/UL BWP if the UE used a default bandwidth PRACH (e.g., 20 MHz). Conversely, a wider bandwidth (e.g., greater than 20 MHz) may be selected for the initial DL/UL BWP if the UE used a wider band PRACH (e.g., greater than 20 MHz).

A BWP for UL/DL may be configured in different ways in different implementations. In some cases, an initial UL BWP and an initial DL BWP may be configured separately. Thus, different bandwidths for the initial UL BWP may be selected based on the PRACH bandwidth in some scenarios. In addition, different bandwidths for the initial DL BWP may be selected based on the PRACH bandwidth in some scenarios. In some examples, the centers of the UL BWP and the DL BWP may be aligned (e.g., for TDD operation). In some examples, the UL BWP and the DL BWP may be paired (e.g., configured together with the same bandwidth).

In some examples, the bandwidth of Coreset 0 may be selected based on the bandwidth used for a PRACH transmission. Here, the RMSI may include multiple configurations for Coreset 0. Other ways of signaling the configurations could be used as well. The bandwidth of Coreset 0 to be used for a particular communication may be based on the bandwidth (e.g., the number of sub-bands) that the UE used to close a link to the BS during the PRACH procedure. For example, a default bandwidth (e.g., 20 MHz) may be selected for Coreset 0 if the UE used a default bandwidth PRACH (e.g., 20 MHz). Conversely, a wider bandwidth (e.g., greater than 20 MHz) may be selected for Coreset 0 if the UE used a wider band PRACH (e.g., greater than 20 MHz).

In some examples, a decision of whether to use interleaved signaling may be based on the bandwidth used for a PRACH transmission. For example, either an interleaved PDCCH (e.g., to spread out REGs for better power boosting) or a non-interleaved PDCCH may be used depending on the PRACH bandwidth.

A coreset is defined in the time domain by 1/2/3 symbols and in the frequency domain by a bitmap with one bit for six consecutive RBs. Here a REG is defined as one RB in one symbol, sequentially indexed, first in time, second in frequency. A set of adjacent REGs is referred to as a REG bundle. If a wide band coreset is used for communication, the REGs of each PDCCH candidate may be physically adjacent. Consequently, the maximum transmit power may be limited by the aggregation level. To enable power boosting (e.g., given a relatively low PSD limit), the following may be used in some examples: a large aggregation level PDCCH (e.g., selected by a scheduler), a coreset spanning a wide bandwidth (e.g., specified by gNB configuration), a small REG bundle (e.g., specified by gNB configuration), and an interleaving scheme that distributes the REGs over different frequencies. In the interleaving scheme, instead of reading columns of a block interleaver sequentially, a skipping parameter S may be used so that columns of the coreset are read every S columns, with wrap-around.

Thus, this interleaving may be used to provide coverage enhancement. Accordingly, in some examples, interleaved signaling may be used if the UE used a wider band PRACH (e.g., greater than 20 MHz). Conversely, the interleaved signaling might not be used (e.g., it might not be needed) if the UE used a default bandwidth PRACH (e.g., 20 MHz).

In some examples, a TBS (e.g., TBS scaling) may be based on the bandwidth used for a PRACH transmission. For example, TBS scaling may be used for PDSCH/PUSCH communication when a wider initial DL/UL BWP is applied.

TBS scaling may be used in some examples for communication on bands that may have a relatively low PSD restriction. According to certain standards, a TBS may be defined to scale with the size of frequency domain resource allocation (FDRA). A larger assignment of resources (in the frequency domain) with higher coding gain may be used to increase transmit power. According to Release 15 of the 5G NR standards, however, given a defined TBS calculation, a larger assignment implies a larger TBS given the same modulation coding scheme (MCS). Accordingly, TBS adjustment may be useful for lowering the coding rate, such as what is done in a paging radio network temporary identifier (P-RNTI) and random access radio network temporary identifier (RA-RNTI) DCI 1_0 with a TB scaling field. In Releases 15/16 of 5G NR, for example, there is a two bit TB scaling field for P-RNTI and RA-RNTI, and msgB-RNTI for DCI 1_0, that allows a TB to be scaled down by factors of 1, ½, or ¼. In certain aspects, TB scaling might only be utilized for lower or lowest modulation coding schemes (MCSs) where the need for reduction in coding rates through TB scaling is more acute.

Accordingly, a UE may, in some circumstances (e.g., when the wireless communication device is at or near a cell edge), elect to transmit and/or receive information using a scaled (e.g., smaller) TBS to close a link with a BS. To this end, in some examples, TBS scaling may be used if the UE used a wider band PRACH (e.g., greater than 20 MHz). Conversely, TBS scaling might not be used (e.g., it might not be needed) if the UE used a default bandwidth PRACH (e.g., 20 MHz).

Table 3 illustrates an example of a mapping 700 that maps PRACH bandwidth (BW) to different communication configurations (e.g., pertaining to PUCCH bandwidth, UL/DL BWP bandwidth, Coreset 0 bandwidth, an interleaving scheme, a TBS scaling scheme). For example, if the PRACH bandwidth (BW) is BW2, the initial PUCCH BW may be set to BW2. As another example, if the PRACH BW is BW1, the initial PUCCH BW may be set to BW1. As yet another example, if the PRACH BW is BW3, the TBS scaling may be set to ¼. As a further example, if the PRACH BW is BW1, interleaving is not used, but if the PRACH BW is BW2 or BW3, interleaving is used. In some example, BW1 corresponds to 20 MHz, BW2 corresponds to 40 MHz, and BW3 corresponds to 40 MHz. Other examples of bandwidth may be used in other implementations. Also, different numbers and/or different types of communication configurations may be used in other implementations.

TABLE 3

| PRACH BW | PUCCH BW | UL/DL BWP BW | CORESET 0 BW | INTER-LEAVING | TBS SCALING |
|---|---|---|---|---|---|
| BW1 | BW1 | BW1 | BW1 | NO | 1 |
| BW2 | BW2 | BW2 | BW2 | YES | ½ |
| BW3 | BW3 | BW3 | BW3 | YES | ¼ |

Figure 7:
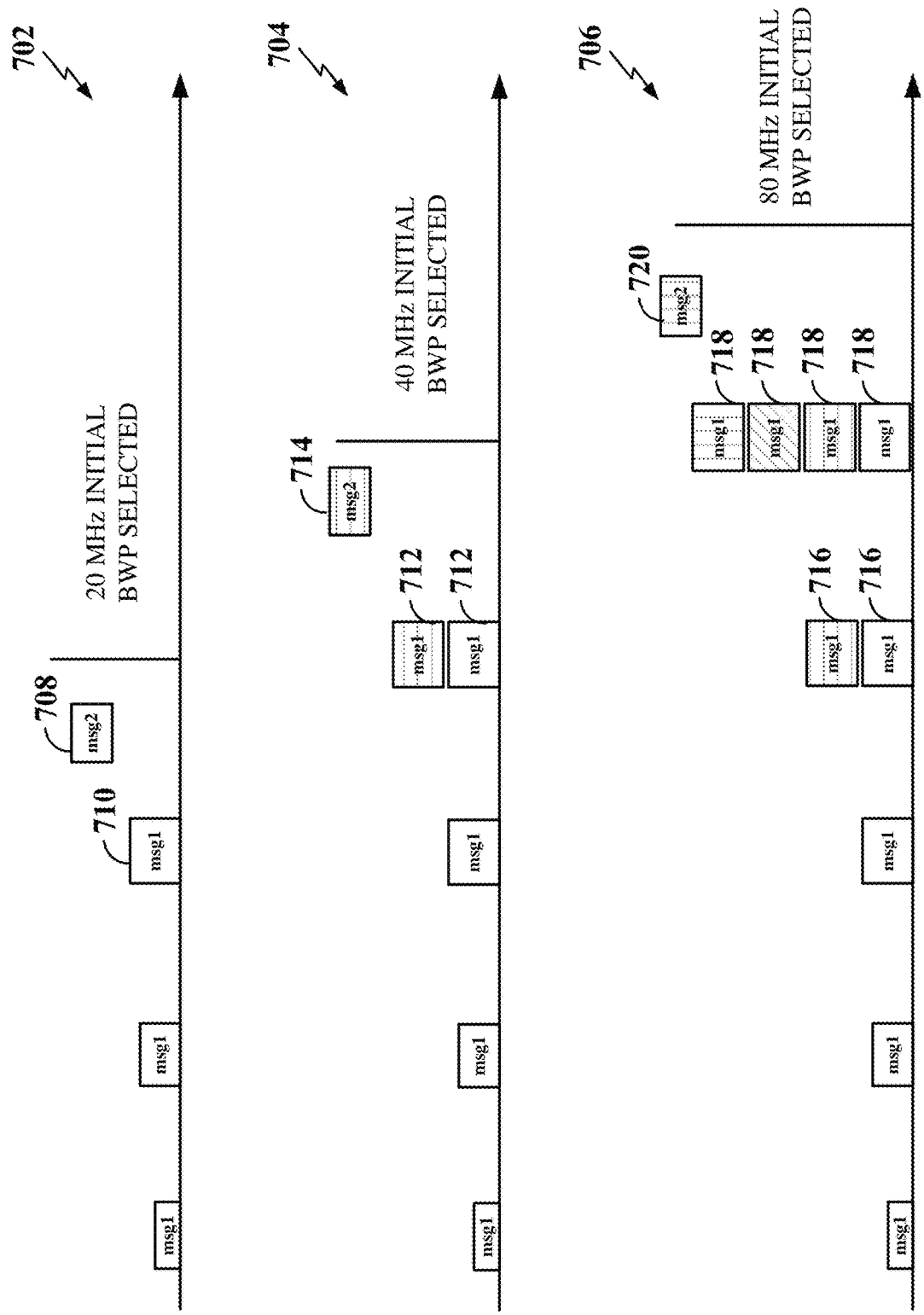
FIG. 7 is a conceptual illustration of an example of a communication configuration selection process according to some aspects of the disclosure.

In some examples, the particular communication configuration (e.g., initial DL/UL BWP, etc.) to be used may depend on which msg1 is acknowledged by a msg2. For example, FIG. 7 illustrates a first example 702, a second example 704, and a third example 706 of PRACH transmissions.

In the first example 702, a UE transmits msg1 for the PRACH on a 20 MHz bandwidth (e.g., a single sub-band or RB set). As shown, the UE increases the power of the msg1 transmission in steps until the UE receives a msg2 708 from the BS. The msg2 is sent on the same sub-band as all of the msg1 transmissions in this case. In this example, the transmission of msg1 710 has sufficient coverage to be successfully decoded by the BS (the preceding msg1 transmissions did not have sufficient coverage to be successfully decoded by the BS). Since the PRACH was successful using the 20 MHz bandwidth, a 20 MHz initial BWP part (or some other corresponding initial communication configuration) may be selected for a subsequent communication (e.g., PUCCH, PUSCH, PDSCH, etc.).

In the second example 704, a UE initially transmits msg1 for the PRACH on a 20 MHz bandwidth (e.g., a single sub-band or RB set), with incremental steps in transmit power. In this case, the UE's transmit power limit is reached because the msg1 transmissions on the 20 MHz BW did not have sufficient coverage to be successfully decoded by the BS. Consequently, the UE subsequently transmits msg1 712 on two 20 MHz sub-bands. In this example, the transmission of msg1 over 40 MHz has sufficient coverage to be successfully decoded by the BS. The UE therefore receives a msg2 714 from the BS. Here, the BS may send the msg2 714 on the second sub-band as indicated in FIG. 7. Since the PRACH was successful using the 40 MHz bandwidth, a 40 MHz initial BWP part (or some other corresponding initial communication configuration) may be selected for a subsequent communication (e.g., PUCCH, PUSCH, PDSCH, etc.).

In the third example 706, a UE initially transmits msg1 for the PRACH on a 20 MHz bandwidth (e.g., a single sub-band or RB set), with incremental steps in transmit power. In this case, the UE's transmit power limit is reached because the msg1 transmissions on the 20 MHz BW did not have sufficient coverage to be successfully decoded by the BS. Consequently, the UE subsequently transmits msg1 716 on two 20 MHz sub-bands. However, the transmission of msg1 over 40 MHz does not have sufficient coverage to be successfully decoded by the BS. Consequently, the UE subsequently transmits msg1 718 on four 20 MHz sub-bands. In this example, the transmission of msg1 over 80 MHz has sufficient coverage to be successfully decoded by the BS. The UE therefore receives a msg2 720 from the BS. Here, the BS may send the msg2 720 on the fourth sub-band as indicated in FIG. 7. Since the PRACH was successful using the 80 MHz bandwidth, an 80 MHz initial BWP part (or some other corresponding initial communication configuration) may be selected for a subsequent communication (e.g., PUCCH, PUSCH, PDSCH, etc.).

Figure 8:
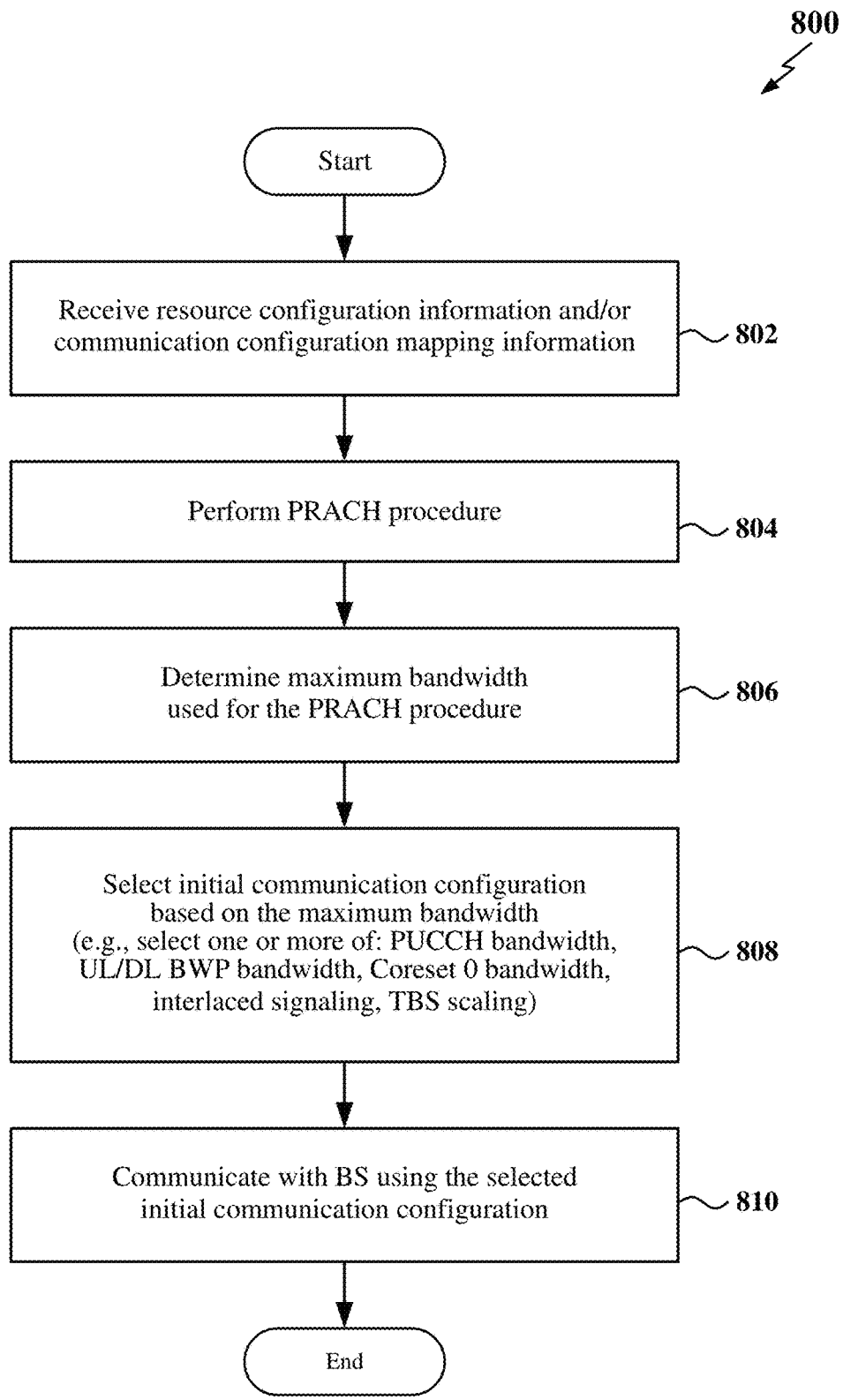
FIG. 8 is a flow chart illustrating an example wireless communication process involving sending PRACH sequences according to some aspects of the disclosure.

FIG. 8 is a flow chart illustrating an example process 800 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the wireless communication device 1000 illustrated in FIG. 10. In some examples, the process 800 may be carried out by any suitable apparatus or means for carrying out the functions or algorithm described below.

At block 802, a wireless communication device may receive resource configuration information and communication configuration mapping information. For example, a BS may allocate and/or schedule multiple sub-bands for the PUCCH, the PUSCH, the PDSCH, and other channels. The wireless communication device may therefore receive at least one indication of this allocation and/or scheduling from the BS. In addition, the wireless communication device may receive communication configuration mapping information (e.g., Table 3) from the BS.

In some examples, receiving resource configuration information and communication configuration mapping information may include monitoring for a broadcast (e.g., a SIB) from a BS (e.g., on a defined resource) that identifies the sub-bands to be used for a particular channel and/or monitoring for a grant message that includes scheduling information that identifies the sub-bands to be used, then decoding any signals received as a result of the monitoring to provide decoded information, and identifying resource configuration information and/or communication configuration mapping information from the decoded information. This operation may also include storing the resource configuration information and/or communication configuration mapping information (e.g., in a memory device).

As used herein, the term allocation means a reservation of a particular resource for a particular purpose. For example, a BS may allocate a particular BWP to be used for a particular channel or by a particular user. Scheduling involves allocation as well and also includes the act of indicating that a particular resource has been allocated (e.g., by sending a grant message to the UE). For example, scheduling may indicate that a sub-set or all of an allocation has been reserved for a UE.

At block 804, the wireless communication device may perform a PRACH procedure. The PRACH procedure may include at least one PRACH operation of a set of PRACH operations. At a minimum, the PRACH procedure involves the wireless communication device transmitting a PRACH sequence. In some examples, the PRACH procedure may also involve the wireless communication device monitoring for a response (e.g., an RAR) to the PRACH sequence. In some examples, the PRACH procedure may involve the wireless communication device repeatedly transmitting a PRACH sequence to the BS until an RAR is received from a BS. In this later case, the PRACH procedure may involve the wireless communication device selecting at least one parameter for each transmission. For example, the wireless communication device may select a first transmission power for the first PRACH sequence transmission, select a higher transmission power for the second PRACH sequence transmission, and so on. As another example, the wireless communication device may select a first bandwidth for the first PRACH sequence transmission, select a wider bandwidth for the second PRACH sequence transmission, and so on.

In some examples, performing a PRACH procedure may include deciding to access a cell, generating a PRACH sequence, and sending the PRACH sequence to a BS. As mentioned above, performing a PRACH procedure may also include monitoring for an RAR and determining, based on the RAR, whether the PRACH sequence was successfully decoded by a BS.

At block 806, the wireless communication device may determine the maximum bandwidth that was used for the PRACH procedure. For example, the wireless communication device may determine which bandwidth resulted in receipt of an RAR. In some examples, determining the bandwidth may include identifying a bandwidth that was selected during the PRACH procedure. In some examples, determining the bandwidth may include selecting a bandwidth for the PRACH procedure.

In some examples, determining the maximum bandwidth that was used for the PRACH procedure may include recording an indication of each bandwidth that was used during the PRACH procedure to send the PRACH sequence(s), comparing the indications, if applicable, to identify the maximum bandwidth used during the PRACH procedure, and generating an indication of this maximum bandwidth.

At block 808, the wireless communication device may select an initial communication configuration to use for a subsequent communication based on the maximum bandwidth determined at block 806. An initial communication configuration refers to a configuration that is used for an initial communication following the PRACH procedure. Here, certain types of communication (e.g., referred to above as a subsequent communication) that occur after the PRACH procedure may be configured to leverage the bandwidth selection made by the PRACH procedure to decide which communication configuration to use (e.g., for the first communication of that type following the PRACH procedure). In this way, the wireless communication device may be able to more quickly determine which communication configuration will result in closing the link the BS. For example, in a cell edge scenario, the wireless communication device would not need to start with the lowest bandwidth for the subsequent communication and increase the bandwidth until the link is closed. Rather, the wireless communication device may start with the final bandwidth selected by PRACH procedure (which may result in immediate closure of the link for the subsequent transmission in some cases).

As discussed above, an initial communication configuration may include, in some examples, any one or more of a bandwidth parameter (e.g., PUCCH bandwidth, UL/DL BWP, Coreset 0 bandwidth), an interleaving scheme (e.g., whether to use interleaving), or a TBS scaling scheme (e.g., which TBS scaling value to use). For example, the wireless communication device may select a bandwidth for an initial PUCCH transmission to the BS. In this case, the initial communication configuration includes the bandwidth for the initial PUCCH transmission. Here, the initial PUCCH transmission refers to the first PUCCH transmission after the PRACH procedure). As another example, the wireless communication device may select a bandwidth for an initial UL/DL BWP (e.g., to be used for an uplink transmission to the BS and/or a downlink reception from the BS). In this case, the initial communication configuration includes the initial bandwidth for the UL/DL BWP. Here, the initial bandwidth for the UL/DL BWP refers to, for an UL or DL transmission that uses an allocated UL/DL BWP, the bandwidth of the BWP used for the first UL or DL transmission after the PRACH procedure). As yet another example, the wireless communication device may select an initial Coreset 0 bandwidth for a subsequent communication with the BS. In this case, the initial communication configuration includes the initial bandwidth for Coreset 0. Here, the initial bandwidth for Coreset 0 refers to the first use of Coreset 0 after the PRACH procedure. As a further example, the wireless communication device may determine whether to use interlaced signaling (e.g., in conjunction with the use of a wider bandwidth) for an uplink and/or downlink communication with the BS. In this case, the initial communication configuration includes an indication of whether interlaced signaling is to be used for an initial transmission. Here, the initial transmission refers to, for transmissions that can use interlaced signaling, the first such transmission after the PRACH procedure. Also, the wireless communication device may determine whether to scale the TBS (e.g., in conjunction with the use of a wider bandwidth) for an uplink and/or downlink communication with the BS. In this case, the initial communication configuration includes an indication of the TBS to be used for an initial transmission. Here, the initial transmission refers to, for transmissions that can use TBS scaling, the first such transmission after the PRACH procedure. The wireless communication device may select one or more of the above communication configurations and/or other communication configurations.

In some cases, subsequent to the use of an initial communication configuration, the wireless communication device may select a different communication configuration to use for a communication. For example, if a UE moves further away from the BS, the UE may select an even wider bandwidth for PUCCH transmission. A BS could specify a different communication configuration to use for a communication as well. For example, the BS may subsequently change the allocated bandwidth for UL transmissions (e.g., due to a change in conditions in the cell) and change the corresponding allocated initial communication configuration accordingly.

In some examples, selecting an initial communication configuration to use for a subsequent communication based on the maximum bandwidth may include identifying the type of the subsequent communication, using Table 3 or some other communication configuration mapping to map the maximum bandwidth to the type of subsequent communication, and thereby determine the initial communication parameter to be used for the subsequent communication.

At block 810, the wireless communication device may communicate with the BS using the selected communication configuration.

In some examples, communicating with the BS using the selected communication configuration may include obtaining information to be transmitted, encoding the information based on the selected communication configuration (e.g., encoding the information for a particular transmission bandwidth, encoding the information according to interleaving, or encoding the information according to the TBS scaling), and outputting the encoded information to a transceiver for transmission to a BS. In some examples, complementary operations may be performed to receive information from a BS.

Figure 9:
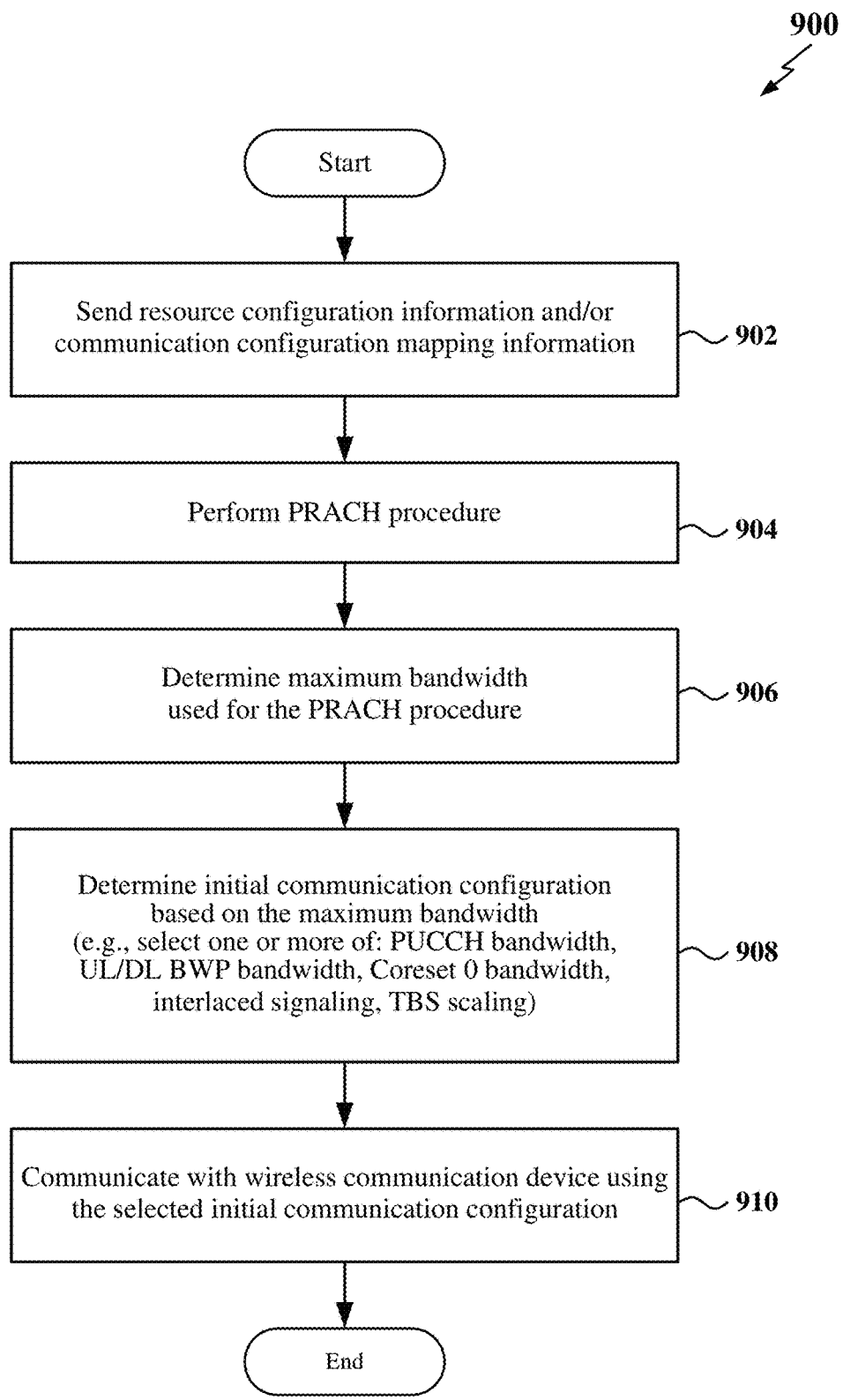
FIG. 9 is a flow chart illustrating an example wireless communication process involving receiving PRACH sequences according to some aspects of the disclosure.

FIG. 9 is a flow chart illustrating an example process 900 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the base station 1200 of FIG. 12. In some examples, the process 900 may be carried out by any suitable apparatus or means for carrying out the functions or algorithm described below.

At block 902, a BS may send resource configuration information and communication configuration mapping information. For example, a BS may allocate and/or schedule multiple sub-bands for the PUCCH, the PUSCH, the PDSCH, and other channels (e.g., more sub-bands may be allocated if traffic within the cell is relatively light) and send at least one indication of this allocation and/or scheduling to a wireless communication device (e.g., the BS may include allocation information indicating the allocated sub-bands in a broadcast SIB as discussed above and/or the BS may include scheduling information indicated the sub-bands scheduled for a particular transmission in a grant message sent to the wireless communication device). In addition, the BS may send communication configuration mapping information (e.g., Table 3) to the UE.

In some examples, sending resource configuration information and communication configuration mapping information may include obtaining the resource configuration information and/or communication configuration mapping information (e.g., from a memory), encoding the resource configuration information and/or communication configuration mapping information to provide encoded information, and sending the encoded information to a transceiver for transmission to a wireless communication device.

At block 904, the BS may perform a PRACH procedure. For example, the BS may receive a PRACH sequence from the wireless communication device and send an RAR to the wireless communication device.

In some examples, performing a PRACH procedure may include monitoring for a transmission on a defined PRACH resource, decoding signals received as a result of the monitoring to provide decoded information, and determining whether a valid PRACH sequence was received. In some examples, performing a PRACH procedure may also include sending an RAR to the wireless communication device that sent the PRACH sequence.

At block 906, the BS may determine the maximum bandwidth that was used for the PRACH procedure. For example, the BS (which will monitor all allocated sub-bands for the PRACH) may determine the number of the sub-bands on which a PRACH sequence were received.

In some examples, determining the maximum bandwidth that was used for the PRACH procedure may include recording an indication of each sub-band on which a PRACH sequence (or sequences) was successfully received, determining the total number of sub-bands, and generating an indication of the maximum bandwidth based on the total number of sub-bands.

At block 908, the BS may determine an initial communication configuration that may be used for a subsequent communication based on the maximum bandwidth determined at block 906. For example, the BS may determine the BW that the wireless communication device will use for an initial PUCCH transmission to the BS. As another example, the BS may determine the bandwidth the wireless communication device will use for an initial UL/DL BWP (e.g., to be used for a downlink control information transmission to the wireless communication device and/or an uplink reception from the wireless communication device). As yet another example, the BS may determine an initial Coreset 0 bandwidth that the wireless communication device will use for a subsequent communication with the BS. As a further example, the BS may determine whether the wireless communication device will use interlaced signaling (e.g., in conjunction with the use of a wider bandwidth) for an uplink and/or downlink communication with the BS. Also, the BS may determine whether the wireless communication device will scale the TBS (e.g., in conjunction with the use of a wider bandwidth) for an uplink and/or downlink communication with the BS. The BS may select one or more of the above communication configurations and/or other communication configurations.

In some examples, determining an initial communication configuration that may be used for a subsequent communication based on the maximum bandwidth may include identifying the type of the subsequent communication, using Table 3 or some other communication configuration mapping to map the maximum bandwidth to the type of subsequent communication, and thereby determine the initial communication parameter to be used for the subsequent communication.

At block 910, the BS may communicate with the wireless communication device using the selected communication configuration.

In some examples, communicating with the wireless communication device using the selected communication configuration may include monitoring for transmissions on an allocated resource (e.g., monitoring using a bandwidth that is based on the maximum bandwidth), decoding any received signals based on a selected communication configuration (e.g., decoding the information according to interleaving, or decoding the information according to the TBS scaling), and storing the decoded information. In some examples, complementary operations may be performed to send information to a wireless communication device.

Figure 10:
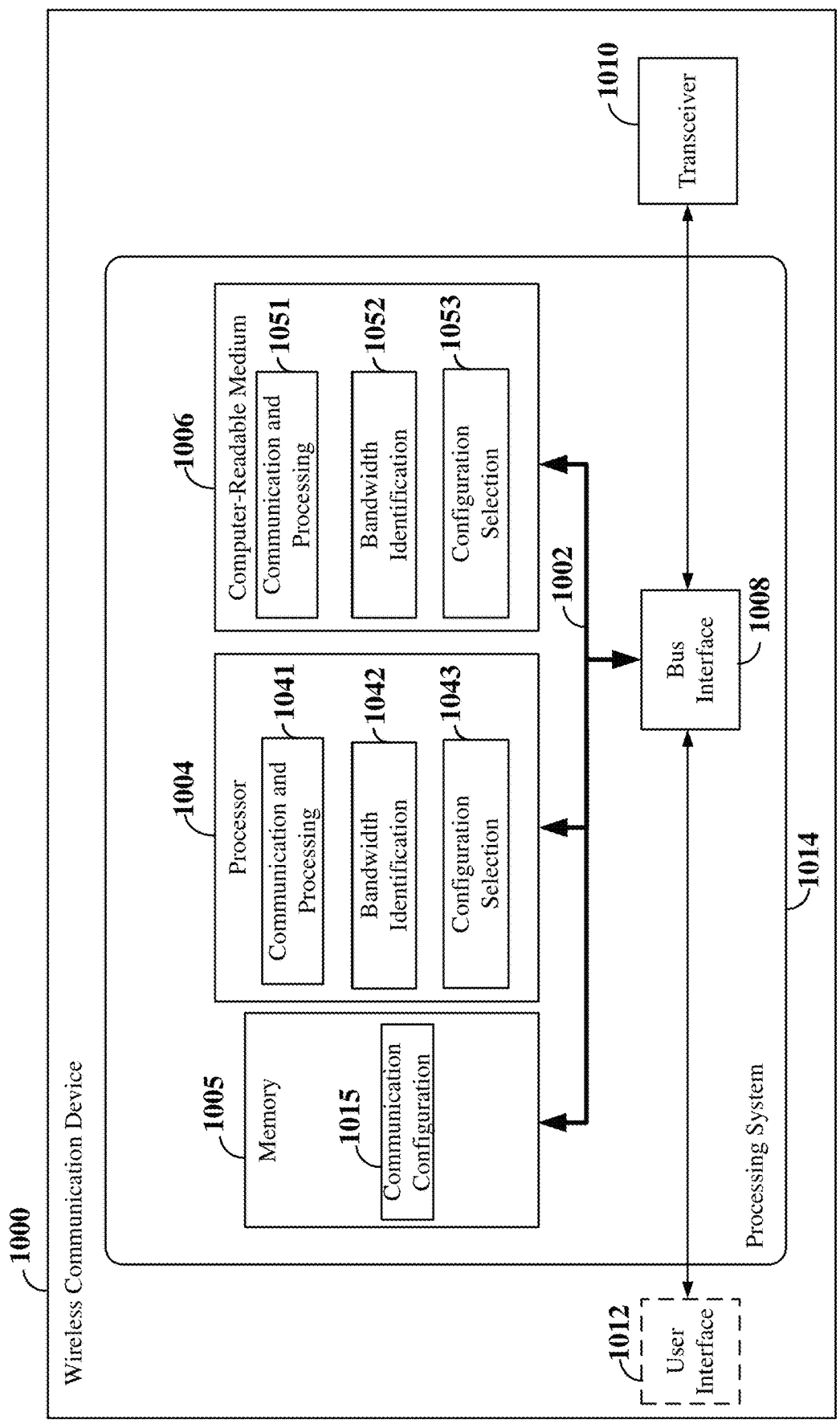
FIG. 10 is a block diagram conceptually illustrating an example of a hardware implementation for a communication device employing a processing system according to some aspects of the disclosure.

FIG. 10 is a diagram illustrating an example of a hardware implementation for a wireless communication device 1000 employing a processing system 1014. For example, the wireless communication device 1000 may be a user equipment (UE) or other device configured to wirelessly communicate with a base station, as discussed in any one or more of FIGS. 1-8. In accordance with various aspects of the disclosure, an element, or any portion of an element, or any combination of elements may be implemented with a processing system 1014 that includes one or more processors 1004. In some implementations, the wireless communication device 1000 may correspond to one or more of the scheduled entity 106 (e.g., a UE, etc.) of FIG. 1 and/or the UE 222, 224, 226, 228, 230, 232, 234, 238, 240, or 242 FIG. 2.

The wireless communication device 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1000 may be configured to perform any one or more of the functions described herein. That is, the processor 1004, as utilized in a wireless communication device 1000, may be used to implement any one or more of the processes and procedures described below.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010 and between the bus 1002 and an interface 1030. The transceiver 1010 provides a communication interface or means for communicating with various other apparatus over a wireless transmission medium. In some examples, the wireless communication device may include two or more transceivers 1010, each configured to communicate with a respective network type (e.g., terrestrial or non-terrestrial). The interface 1030 provides a communication interface or means of communicating with various other apparatus and devices (e.g., other devices housed within the same apparatus as the wireless communication device or other external apparatus) over an internal bus or external transmission medium, such as an Ethernet cable. Depending upon the nature of the apparatus, a user interface 1012 (e.g., keypad, display, speaker, microphone, joystick) may also be provided. Of course, such a user interface 1012 is optional, and may be omitted in some examples, such as an IoT device.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless communication device 1000 may be configured to perform any one or more of the operations described herein (e.g., as described above in conjunction with FIGS. 1-9 and as described below in conjunction with FIG. 11). In some aspects of the disclosure, the processor 1004, as utilized in the wireless communication device 1000, may include circuitry configured for various functions.

The processor 1004 may include communication and processing circuitry 1041. The communication and processing circuitry 1041 may include one or more hardware components that provide the physical structure that performs various processes related to wireless communication (e.g., signal reception and/or signal transmission) as described herein. The communication and processing circuitry 1041 may further include one or more hardware components that provide the physical structure that performs various processes related to signal processing (e.g., processing a received signal and/or processing a signal for transmission) as described herein. In some examples, the communication and processing circuitry 1041 may include two or more transmit/receive chains, each configured to process signals in a different RAT (or RAN) type. The communication and processing circuitry 1041 may further be configured to execute communication and processing software 1051 included on the computer-readable medium 1006 to implement one or more functions described herein.

In some implementations where the communication involves receiving information, the communication and processing circuitry 1041 may obtain information from a component of the wireless communication device 1000 (e.g., from the transceiver 1010 that receives the information via radio frequency signaling or some other type of signaling suitable for the applicable communication medium), process (e.g., decode) the information, and output the processed information. For example, the communication and processing circuitry 1041 may output the information to another component of the processor 1004, to the memory 1005, or to the bus interface 1008. In some examples, the communication and processing circuitry 1041 may receive one or more of signals, messages, other information, or any combination thereof. In some examples, the communication and processing circuitry 1041 may receive information via one or more channels. In some examples, the communication and processing circuitry 1041 may include functionality for a means for receiving.

In some implementations where the communication involves sending (e.g., transmitting) information, the communication and processing circuitry 1041 may obtain information (e.g., from another component of the processor 1004, the memory 1005, or the bus interface 1008), process (e.g., encode) the information, and output the processed information. For example, the communication and processing circuitry 1041 may output the information to the transceiver 1010 (e.g., that transmits the information via radio frequency signaling or some other type of signaling suitable for the applicable communication medium). In some examples, the communication and processing circuitry 1041 may send one or more of signals, messages, other information, or any combination thereof. In some examples, the communication and processing circuitry 1041 may send information via one or more channels. In some examples, the communication and processing circuitry 1041 may include functionality for a means for sending (e.g., means for transmitting).

The processor 1004 may include bandwidth identification circuitry 1042 configured to perform bandwidth identification-related operations as discussed herein (e.g., determining what bandwidth resulted in the receipt of msg2). The bandwidth identification circuitry 1042 may include functionality for a means for identifying a bandwidth. The bandwidth identification circuitry 1042 may further be configured to execute bandwidth identification software 1052 included on the computer-readable medium 1006 to implement one or more functions described herein.

The processor 1004 may include configuration selection circuitry 1043 configured to perform configuration selection-related operations as discussed herein (e.g., using Table 3). The configuration selection circuitry 1043 may include functionality for a means for selecting at least one initial communication configuration. The configuration selection circuitry 1043 may further be configured to execute configuration selection software 1053 included on the computer-readable medium 1006 to implement one or more functions described herein.

Figure 11:
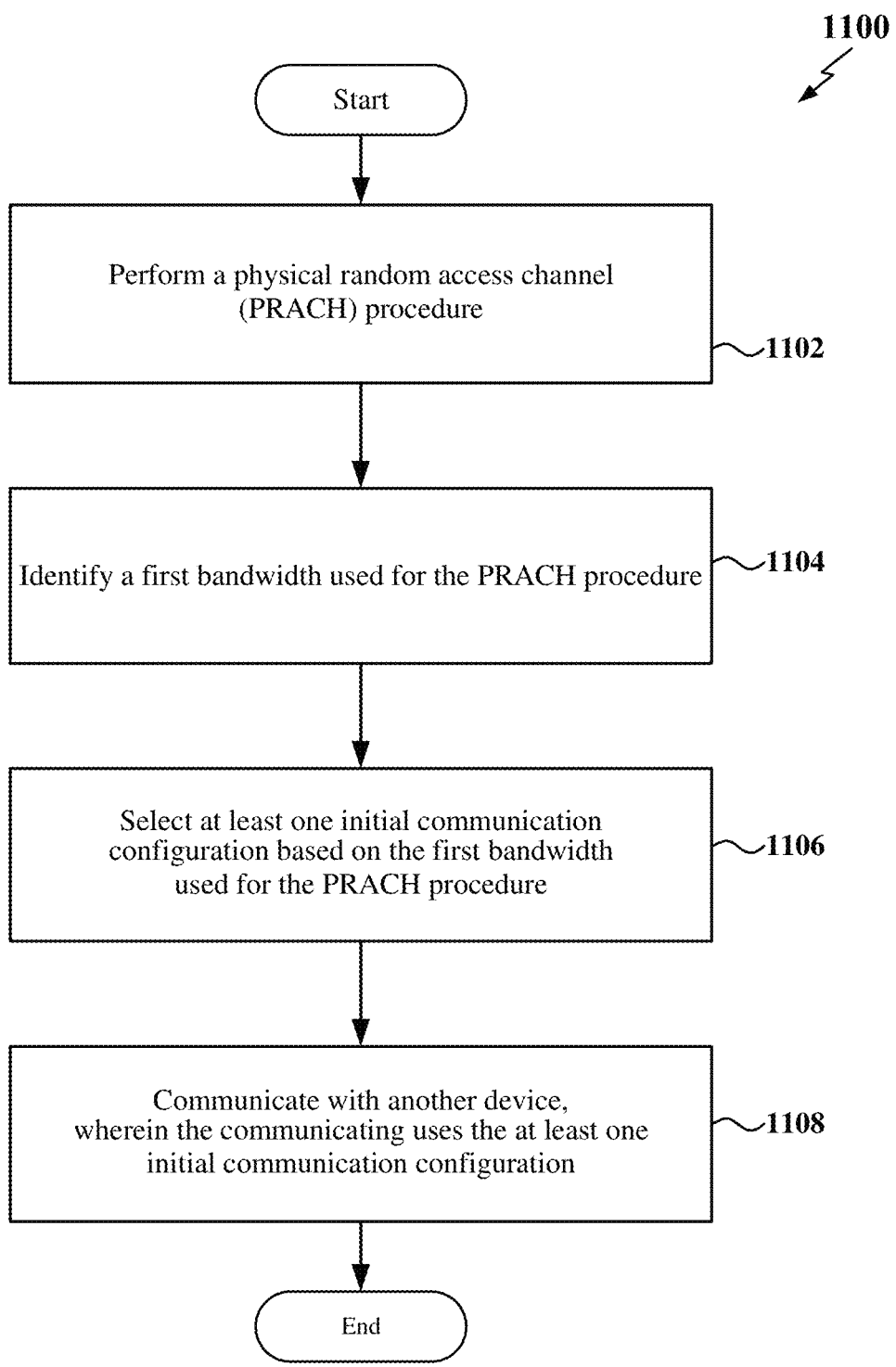
FIG. 11 is a flow chart illustrating an example wireless communication process according to some aspects of the disclosure.

FIG. 11 is a flow chart illustrating an example process 1100 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the wireless communication device 1000 illustrated in FIG. 10. In some aspects, the wireless communication device may be a user equipment. In some examples, the process 1100 may be carried out by any suitable apparatus or means for carrying out the functions or algorithm described below.

At block 1102, a wireless communication device may perform a physical random access channel (PRACH) procedure. For example, the communication and processing circuitry 1041 and transceiver 1010, shown and described above in connection with FIG. 10, may send at least one PRACH sequence on at least one sub-band and receive an RAR on at least one sub-band. In some aspects, the wireless communication device may be a user equipment.

In some examples, performing a physical random access channel (PRACH) procedure may include deciding to access a cell, generating a PRACH sequence, and sending the PRACH sequence to a BS. As mentioned above, performing a PRACH procedure may also include monitoring for an RAR and determining, based on the RAR, whether the PRACH sequence was successfully decoded by a BS.

In some aspects, the PRACH procedure may include determining that a maximum transmit power for a PRACH transmission within one sub-band has been reached and, after determining that the maximum transmit power for the PRACH transmission within one sub-band has been reached, concurrently sending a first PRACH sequence on a first sub-band and a second PRACH sequence on a second sub-band.

In some aspects, the PRACH procedure may include determining that a response to a PRACH transmission that was sent on one sub-band was not received and, after determining that the response to the PRACH transmission that was sent on one sub-band was not received, concurrently sending a first PRACH sequence on a first sub-band and a second PRACH sequence on a second sub-band. For example, the wireless communication device may have transmitted a PRACH sequence on one sub-band of an allocated set of sub-bands. If the wireless communication device does not receive a response to this PRACH transmission from a BS, the wireless communication device may send PRACH sequences on two of the sub-bands. In some examples, the first PRACH sequence and the second PRACH sequence use the same sequence (e.g., the first PRACH sequence and the second PRACH sequence are comprised of the same sequence). In some examples, the first PRACH sequence and the second PRACH sequence comprise different sequences (i.e., the first PRACH sequence is a different sequence than the second PRACH sequence).

In some aspects, the PRACH procedure may include determining that a response to a PRACH transmission that was sent on two sub-bands was not received and, after determining that the response to the PRACH transmission that was sent on two sub-bands was not received, concurrently sending a first PRACH sequence on a first sub-band, a second PRACH sequence on a second sub-band, a third PRACH sequence on a third sub-band, and a fourth PRACH sequence on a fourth sub-band. For example, the wireless communication device may have transmitted PRACH sequences on two sub-bands of an allocated set of sub-bands. If the wireless communication device does not receive a response to this PRACH transmission from a BS, the wireless communication device may send PRACH sequences on four of the sub-bands. In some examples, two or more of the first PRACH sequence, the second PRACH sequence, the third PRACH sequence, and the fourth PRACH sequence use the same sequence (e.g., the first PRACH sequence and the second PRACH sequence are comprised of the same sequence). In some examples, the first PRACH sequence, the second PRACH sequence, the third PRACH sequence, and the fourth PRACH sequence comprise different sequences (i.e., the first PRACH sequence is a different bit sequence than the second PRACH sequence, the third PRACH sequence, and the fourth PRACH sequence, the second PRACH sequence is a different bit sequence than the third PRACH sequence, and so on).

At block 1104, the wireless communication device may identify a first bandwidth used for the PRACH procedure. For example, the bandwidth identification circuitry 1042 in cooperation with the communication and processing circuitry 1041 and transceiver 1010, shown and described above in connection with FIG. 10, may determine how many sub-bands were used to send a msg1 that resulted in the receipt of an RAR. In some examples, identifying the first bandwidth may include ascertaining a bandwidth that was selected during the PRACH procedure.

In some examples, identifying a first bandwidth used for the PRACH procedure may include recording an indication of each bandwidth that was used during the PRACH procedure to send PRACH sequence(s), comparing the indications, if applicable, to identify the maximum bandwidth used during the PRACH procedure, and generating an indication of this maximum bandwidth.

In some aspects, the first bandwidth used for the PRACH procedure may include one sub-band, two sub-bands, or four sub-bands. In some aspects, identifying the first bandwidth used for the PRACH procedure may include determining a maximum number of sub-bands used concurrently during the PRACH procedure.

At block 1106, the wireless communication device may select at least one initial communication configuration based on the first bandwidth used for the PRACH procedure. For example, the configuration selection circuitry 1042 in cooperation with the communication and processing circuitry 1041 and transceiver 1010, shown and described above in connection with FIG. 10, may use a mapping (e.g., as in Table 3) to identify at least one initial communication configuration that is mapped to the first bandwidth. In some aspects, the at least one initial communication configuration may include at least one of a second bandwidth for an uplink control transmission, an uplink bandwidth part (BWP) parameter, a downlink BWP parameter, a third bandwidth parameter for a control resource set (coreset), an interleaving scheme for a downlink control information transmission (e.g., whether to use interleaving for the downlink control information transmission), a transport block size (TBS) scaling scheme (e.g., which TBS scaling value to use), or any combination thereof.

In some examples, selecting at least one initial communication configuration based on the first bandwidth used for the PRACH procedure may include identifying the type of a subsequent communication (e.g., PUCCH, PDCCH, etc.), using Table 3 or some other communication configuration mapping to map the first bandwidth to the type of subsequent communication, and thereby determine the at least one initial communication parameter to be used for the subsequent communication.

In some aspects, selecting the at least one initial communication configuration based on the first bandwidth used for the PRACH procedure may include selecting a first configuration for a first value of the first bandwidth or selecting a second configuration for a second value of the first bandwidth. For example, if the value of the first bandwidth used for the PRACH procedure is 20 MHz (the first value), the first configuration may be selected for a subsequent communication. In contrast, if the value of the first bandwidth is 40 MHz (the second value), the second configuration may be selected for the subsequent communication. In some aspects, the second configuration may correspond to a larger coverage area than the first configuration.

In some aspects, the other device may be a base station. In some aspects, the method may further include receiving a set of configurations from the base station. In some aspects, selecting the at least one initial communication configuration may include selecting, based on the first bandwidth used for the PRACH procedure, the at least one initial communication configuration from the set of configurations.

In some aspects, the at least one initial communication configuration may include a first configuration and a second configuration. In some aspects, selecting the at least one initial communication configuration based on the first bandwidth used for the PRACH procedure may include selecting the first configuration after determining that the first bandwidth used for the PRACH procedure is one sub-band; or selecting the second configuration after determining that the first bandwidth used for the PRACH procedure is two sub-bands.

In some aspects, the at least one initial communication configuration may include a first configuration, a second configuration, and a third configuration. In some aspects, selecting the at least one initial communication configuration based on the first bandwidth used for the PRACH procedure may include selecting the first configuration after determining that the first bandwidth used for the PRACH procedure is one sub-band; selecting the second configuration after determining that the first bandwidth used for the PRACH procedure is two sub-bands; or selecting the third configuration after determining that the first bandwidth used for the PRACH procedure is four sub-bands. For example, for a designated type of communication (e.g., that leverages the bandwidth selection of the PRACH procedure), the initial communication for that type of communication following the PRACH procedure may use (depending on the bandwidth used for the PRACH procedure) one of the first configuration, the second configuration, or the third configuration.

At block 1108, the wireless communication device may communicate with another device, wherein the communication uses the at least one initial communication configuration. For example, the communication and processing circuitry 1041 and transceiver 1010, shown and described above in connection with FIG. 10, may use the at least one initial communication configuration to transmit and/or receive information (for an initial transmission and/or reception that occurs after the PRACH procedure). In some aspects, the communication with the other device may be on an unlicensed radio frequency spectrum.

In some examples, communicating with the BS using the selected communication configuration may include obtaining information to be transmitted, encoding the information based on the selected communication configuration (e.g., encoding the information for a particular transmission bandwidth, encoding the information according to interleaving, or encoding the information according to the TBS scaling), and outputting the encoded information to a transceiver for transmission to a BS. In some examples, complementary operations may be performed to receive information from a BS.

In some aspects, the at least one initial communication configuration may include an initial bandwidth for an uplink control transmission. In some aspects, the method may further include selecting the initial bandwidth for the uplink control transmission based on the first bandwidth used for the PRACH procedure. In some aspects, the communicating may include transmitting uplink control information using the initial bandwidth for the uplink control information.

In some aspects, the at least one initial communication configuration may include an initial uplink bandwidth part (BWP) and downlink BWP pair parameter (UL/DL BWP pair parameter). In some aspects, the method may further include selecting a second bandwidth for the initial uplink BWP and downlink BWP pair parameter based on the first bandwidth used for the PRACH procedure. In some aspects, the communicating may include communicating using the second bandwidth for the initial uplink BWP and downlink BWP pair parameter.

In some aspects, the at least one initial communication configuration may include an initial downlink bandwidth part (BWP) parameter. In some aspects, the method may further include selecting a second bandwidth for the initial downlink BWP parameter based on the first bandwidth used for the PRACH procedure. In some aspects, the communicating may include receiving downlink information using the second bandwidth for the initial downlink BWP parameter.

In some aspects, the at least one initial communication configuration may include an initial uplink bandwidth part (BWP) parameter. In some aspects, the method may further include selecting a second bandwidth for the initial uplink BWP parameter based on the first bandwidth used for the PRACH procedure. In some aspects, the communicating may include transmitting uplink information using the second bandwidth for the initial uplink BWP parameter.

In some aspects, the at least one initial communication configuration may include a second bandwidth for a control resource set (coreset) configured by a master information block (MIB). In some aspects, the method may further include selecting the second bandwidth for the coreset based on the first bandwidth used for the PRACH procedure. In some aspects, the communicating may include receiving information using the second bandwidth for the coreset configured by the MIB.

In some aspects, the at least one initial communication configuration indicates whether interleaving is to be used for a downlink control information transmission. In some aspects, the method may further include determining whether interleaving is used for the downlink control information transmission based on the first bandwidth used for the PRACH procedure. In some aspects, the communicating may include receiving downlink information according to the determination of whether the interleaving is used.

In some aspects, the at least one initial communication configuration may include a transport block size (TBS) scaling scheme. In some aspects, the method may further include selecting a TBS scaling value (e.g., 1, ½, ¼, etc.) based on the first bandwidth used for the PRACH procedure. In some aspects, the communicating may include communicating information according to the TBS scaling value.

Figure 12:
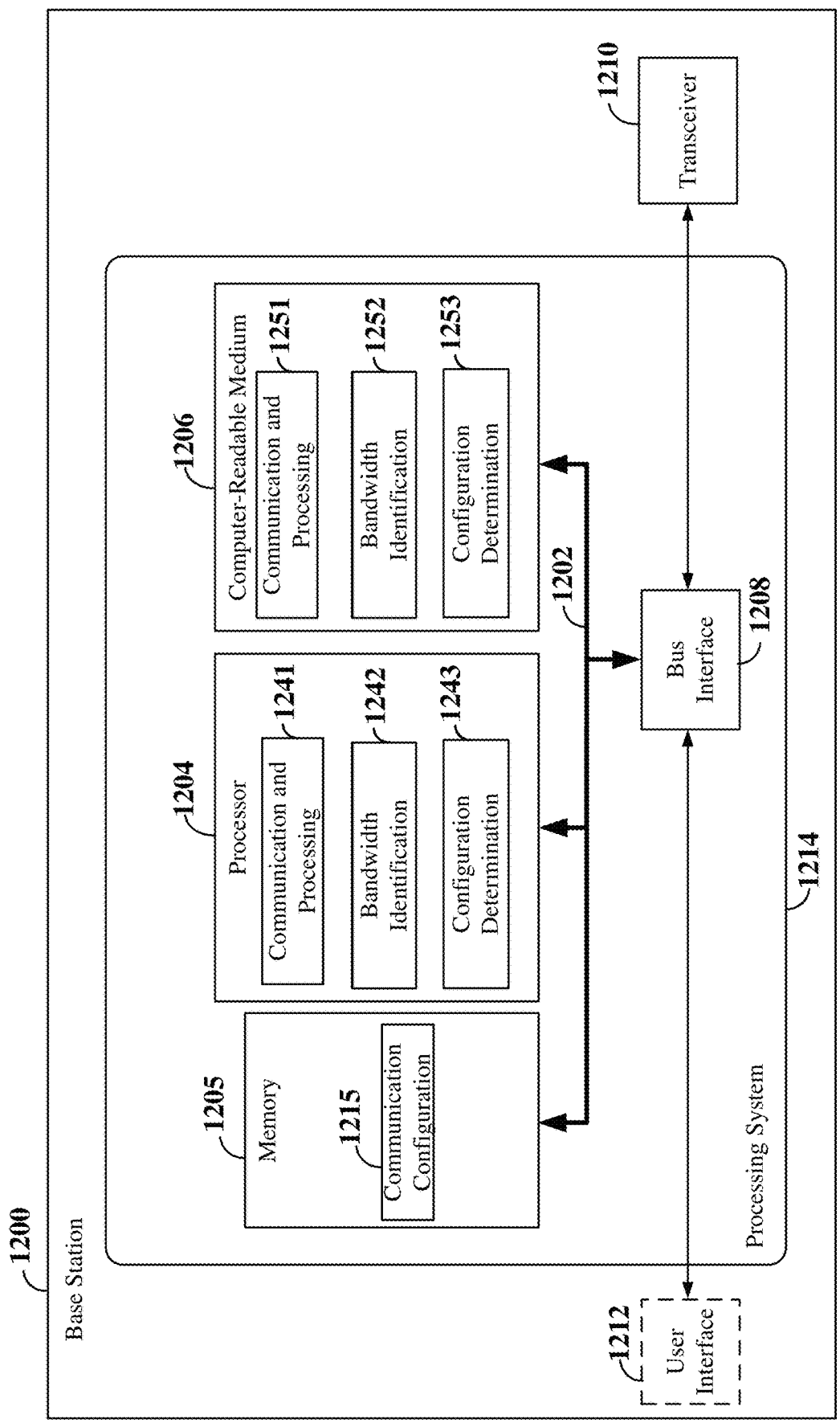
FIG. 12 is a block diagram conceptually illustrating an example of a hardware implementation for a communication device employing a processing system according to some aspects of the disclosure.

FIG. 12 is a conceptual diagram illustrating an example of a hardware implementation for base station (BS) 1200 employing a processing system 1214. In accordance with various aspects of the disclosure, an element, or any portion of an element, or any combination of elements may be implemented with a processing system 1214 that includes one or more processors 1204. In some implementations, the BS 1200 may correspond to one or more of the scheduling entity 108 (e.g., a gNB, a transmit receive point, a UE, etc.) of FIG. 1 and/or the base station 210, 212, 214, or 218 of FIG. 2.

The processing system 1214 may be substantially the same as the processing system 1014 illustrated in FIG. 10, including a bus interface 1208, a bus 1202, memory 1205, a processor 1204, and a computer-readable medium 1206. Furthermore, the core BS 1200 may include an interface 1230 (e.g., a network interface) that provides a means for communicating with various other apparatus within the core network and with one or more radio access network.

The BS 1200 may be configured to perform any one or more of the operations described herein (e.g., as described above in conjunction with FIGS. 1-9 and as described below in conjunction with FIG. 13). In some aspects of the disclosure, the processor 1204, as utilized in the BS 1200, may include circuitry configured for various functions.

In some aspects of the disclosure, the processor 1204 may include communication and processing circuitry 1241. The communication and processing circuitry 1241 may include one or more hardware components that provide the physical structure that performs various processes related to communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. The communication and processing circuitry 1241 may further be configured to execute communication and processing software 1251 included on the computer-readable medium 1206 to implement one or more functions described herein.

In some implementations where the communication involves receiving information, the communication and processing circuitry 1241 may obtain information from a component of the BS 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving.

In some implementations where the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., means for transmitting).

The processor 1204 may include bandwidth identification circuitry 1242 configured to perform bandwidth identification-related operations as discussed herein (e.g., determining the bandwidth associated with a received PRACH sequence). The bandwidth identification circuitry 1242 may include functionality for a means for identifying a bandwidth. The bandwidth identification circuitry 1242 may further be configured to execute bandwidth identification software 1252 included on the computer-readable medium 1206 to implement one or more functions described herein.

The processor 1204 may include configuration determination circuitry 1243 configured to perform configuration determination-related operations as discussed herein (e.g., using Table 3). The configuration determination circuitry 1243 may include functionality for a means for determining at least one initial communication configuration. The configuration determination circuitry 1243 may further be configured to execute waveform processing software 1253 included on the computer-readable medium 1206 to implement one or more functions described herein.

Figure 13:
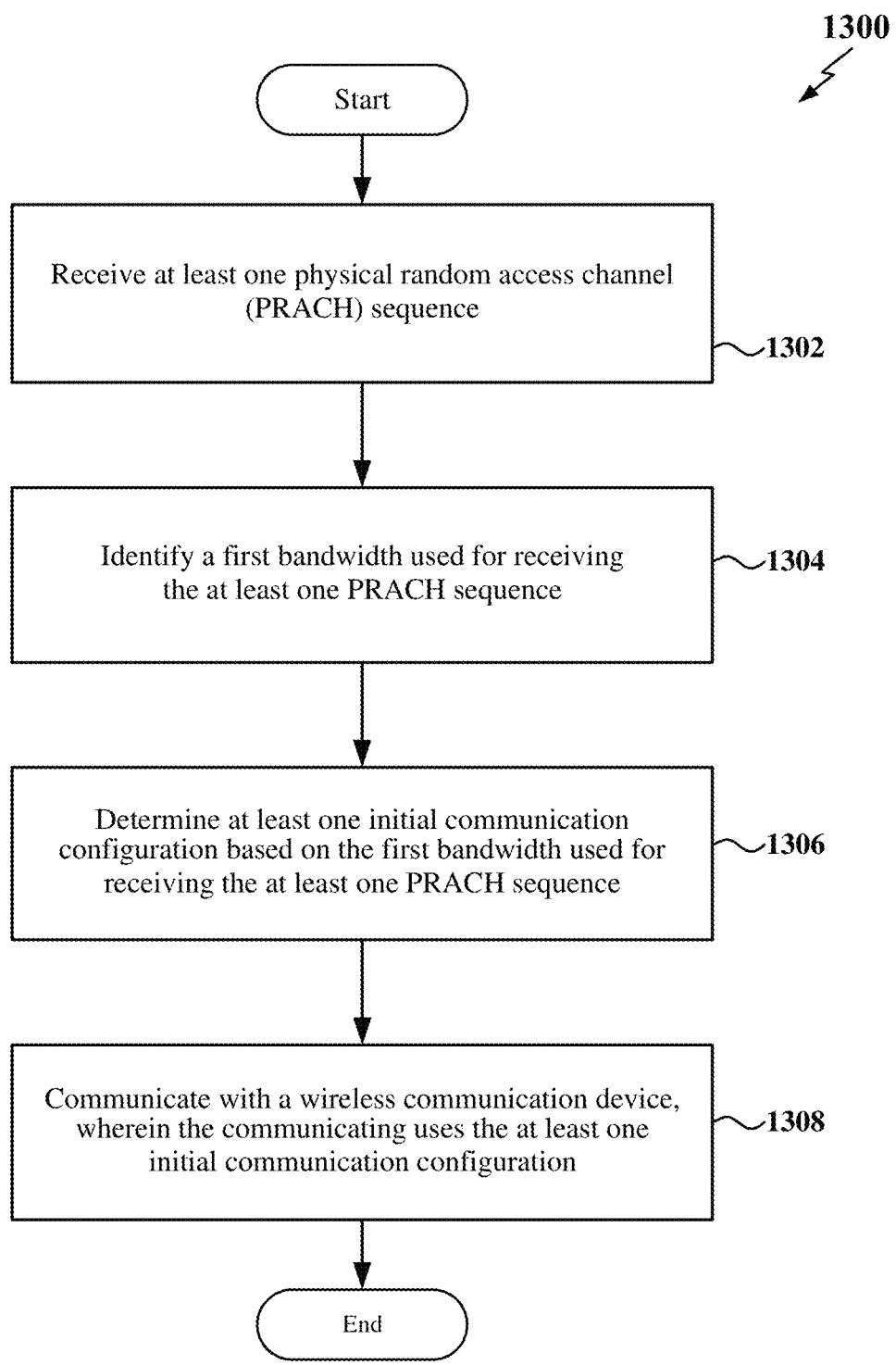
FIG. 13 is a flow chart illustrating an example wireless communication process according to some aspects of the disclosure.

FIG. 13 is a flow chart illustrating another example process 1300 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the BS 1200 illustrated in FIG. 12. In some examples, the process 1300 may be carried out by any suitable apparatus or means for carrying out the functions or algorithm described below.

At block 1302, a BS may receive at least one physical random access channel (PRACH) sequence. For example, the communication and processing circuitry 1241 and transceiver 1210, shown and described above in connection with FIG. 12, may monitor one or more sub-bands (e.g., according to a configuration) for PRACH sequences and then decode any received PRACH sequences.

In some examples, receiving at least one physical random access channel (PRACH) sequence may include monitoring for a transmission on a defined PRACH resource, decoding signals received as a result of the monitoring to provide decoded information, and determining whether a valid PRACH sequence was received.

At block 1304, the BS may identify a first bandwidth used for receiving the at least one PRACH sequence. For example, the bandwidth identification circuitry 1242 in cooperation with the communication and processing circuitry 1241 and transceiver 1210, shown and described above in connection with FIG. 12, may determine the number of sub-bands that a successfully decoded msg1 was received on.

In some examples, identifying a first bandwidth used for receiving the at least one PRACH sequence may include recording an indication of each sub-band on which a PRACH sequence (or sequences) was successfully received, determining the total number of sub-bands, and generating an indication of the first bandwidth based on the total number of sub-bands.

In some aspects, the first bandwidth used for receiving the at least one PRACH sequence may include one resource block (RB) set, two sub-bands, or four sub-bands. In some aspects, identifying the first bandwidth used for receiving the at least one PRACH sequence may include determining a maximum number of sub-bands used concurrently for receiving the at least one PRACH sequence.

At block 1306, the BS may determine at least one initial communication configuration based on the first bandwidth used for receiving the at least one PRACH sequence. For example, the configuration determination circuitry 1242 in cooperation with the communication and processing circuitry 1241 and transceiver 1210, shown and described above in connection with FIG. 12, may use a mapping (e.g., as in Table 3) to identify at least one initial communication configuration that is mapped to the first bandwidth. In some aspects, the at least one initial communication configuration may include at least one of a second bandwidth for an uplink control transmission, an uplink bandwidth part (BWP) parameter, a downlink BWP parameter, a third bandwidth parameter for a control resource set (coreset), an interleaving scheme for a downlink control information transmission, a transport block size (TBS) scheme, or any combination thereof.

In some examples, determining at least one initial communication configuration based on the first bandwidth used for receiving the at least one PRACH sequence may include identifying the type of a subsequent communication (e.g., PUCCH, PDCCH, etc.), using Table 3 or some other communication configuration mapping to map the first bandwidth to the type of subsequent communication, and thereby determine the at least one initial communication parameter to be used for the subsequent communication.

In some aspects, determining the at least one initial communication configuration based on the first bandwidth used for receiving the at least one PRACH sequence may include selecting a first configuration for a first value of the first bandwidth or selecting a second configuration for a second value of the first bandwidth, wherein the second configuration corresponds to a larger coverage area than the first configuration.

In some aspects, the method may further include sending a set of configurations to the wireless communication device. In some aspects, determining the at least one initial communication configuration may include selecting, based on the first bandwidth used for receiving the at least one PRACH sequence, the at least one initial communication configuration from the set of configurations.

In some aspects, the at least one initial communication configuration may include a first configuration and a second configuration. In some aspects, determining the at least one initial communication configuration based on the first bandwidth used for receiving the at least one PRACH sequence may include selecting the first configuration after determining that the first bandwidth used for receiving the at least one PRACH sequence is one sub-band or selecting the second configuration after determining that the first bandwidth used for receiving the at least one PRACH sequence is two sub-bands.

In some aspects, the at least one initial communication configuration may include a first configuration, a second configuration, and a third configuration. In some aspects, determining the at least one initial communication configuration based on the first bandwidth used for receiving the at least one PRACH sequence may include selecting the first configuration after determining that the first bandwidth used for receiving the at least one PRACH sequence is one sub-band, selecting the second configuration after determining that the first bandwidth used for receiving the at least one PRACH sequence is two sub-bands, or selecting the third configuration after determining that the first bandwidth used for receiving the at least one PRACH sequence is four sub-bands.

At block 1308, the BS may communicate with a wireless communication device, wherein the communication with the wireless communication device may use the at least one initial communication configuration. For example, the communication and processing circuitry 1241 and transceiver 1210, shown and described above in connection with FIG. 12, may use the at least one initial communication configuration to transmit and/or receive information (for an initial transmission and/or reception that occurs after receiving the PRACH sequence). In some aspects, the communication may be on an unlicensed radio frequency spectrum. In some aspects, the wireless communication device may be a user equipment.

In some examples, communicating with the wireless communication device using the at least one initial communication configuration may include monitoring for transmissions on an allocated resource (e.g., monitoring using a bandwidth that is based on the first bandwidth), decoding any received signals based on a selected initial communication configuration (e.g., decoding the information according to interleaving, or decoding the information according to the TBS scaling), and storing the decoded information. In some examples, complementary operations may be performed to send information to a wireless communication device.

In some aspects, the at least one initial communication configuration may include an initial bandwidth for an uplink control transmission. In some aspects, the method may further include determining the initial bandwidth for the uplink control transmission based on the first bandwidth used for receiving the at least one PRACH sequence. In some aspects, the communicating may include receiving uplink control information using the initial bandwidth for the uplink control information.

In some aspects, the at least one initial communication configuration may include an initial uplink bandwidth part (BWP) and downlink BWP pair parameter (UL/DL BWP parameter). In some aspects, the method may further include determining a second bandwidth for the initial uplink BWP and downlink BWP pair parameter based on the first bandwidth used for receiving the at least one PRACH sequence. In some aspects, the communicating may include communicating using the second bandwidth for the initial uplink BWP and downlink BWP pair parameter.

In some aspects, the at least one initial communication configuration may include an initial downlink bandwidth part (BWP) parameter. In some aspects, the method may further include determining a second bandwidth for the initial downlink BWP parameter based on the first bandwidth used for receiving the at least one PRACH sequence. In some aspects, the communicating may include sending downlink information using the second bandwidth for the initial downlink BWP parameter.

In some aspects, the at least one initial communication configuration may include an initial uplink bandwidth part (BWP) parameter. In some aspects, the method may further include determining a second bandwidth for the initial uplink BWP parameter based on the first bandwidth used for receiving the at least one PRACH sequence. In some aspects, the communicating may include receiving uplink information using the second bandwidth for the initial uplink BWP parameter.

In some aspects, the at least one initial communication configuration may include a second bandwidth for a control resource set (coreset) configured by a master information block (MIB). In some aspects, the method may further include determining the second bandwidth for the coreset based on the first bandwidth used for receiving the at least one PRACH sequence. In some aspects, the communicating may include sending information using the second bandwidth for the coreset configured by the MIB.

In some aspects, the at least one initial communication configuration indicates whether interleaving is to be used for a downlink control information transmission. In some aspects, the method may further include determining whether interleaving is used for the downlink control information transmission based on the first bandwidth used for receiving the at least one PRACH sequence. In some aspects, the communicating may include sending downlink information according to the determination of whether the interleaving is used.

In some aspects, the at least one initial communication configuration may include a transport block size (TBS) scaling scheme. In some aspects, the method may further include determining the TBS scaling based on the first bandwidth used for receiving the at least one PRACH sequence. In some aspects, the communicating may include communicating information according to the TBS scaling scheme.

III. ADDITIONAL ASPECTS

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 10, and 12 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of communication at a wireless communication device, the method comprising:
   receiving a mapping of different physical random access channel (PRACH) bandwidths to different communication configurations;
   performing a PRACH procedure;
   identifying a first bandwidth used for the PRACH procedure;
   selecting at least one initial communication configuration based on the first bandwidth used for the PRACH procedure and based on the mapping of different PRACH bandwidths to different communication configurations; and
   communicating with another device, wherein the communicating uses the at least one initial communication configuration.

2. A wireless communication device, comprising:
   a transceiver;
   one or more memories that store processor-executable code; and
   one or more processors configured to execute the processor-executable code and cause the wireless communication device to:
      receive a mapping of different physical random access channel (PRACH) bandwidths to different communication configurations;
      perform a PRACH procedure;
      identify a first bandwidth used for the PRACH procedure;
      select at least one initial communication configuration based on the first bandwidth used for the PRACH procedure and based on the mapping of different PRACH bandwidths to different communication configurations; and communicate with another device via the transceiver, wherein the communication with the other device uses the at least one initial communication configuration.

3. The wireless communication device of claim 2, wherein the communication with the other device is via an unlicensed radio frequency spectrum.

4. The wireless communication device of claim 2, wherein the first bandwidth used for the PRACH procedure comprises one sub-band, two sub-bands, or four sub-bands.

5. The wireless communication device of claim 2, wherein, to identify the first bandwidth, the one or more processors are further configured to execute the processor-executable code and cause the wireless communication device to:
determine a maximum number of sub-bands used concurrently during the PRACH procedure.

6. The wireless communication device of claim 2, wherein, to select the at least one initial communication configuration, the one or more processors are further configured to execute the processor-executable code and cause the wireless communication device to:
select a first configuration from the mapping for a first value of the first bandwidth; or
select a second configuration from the mapping for a second value of the first bandwidth, wherein the second configuration corresponds to a larger coverage area than the first configuration.

7. The wireless communication device of claim 2, wherein the at least one initial communication configuration comprises at least one of: a second bandwidth for an uplink control transmission, an uplink bandwidth part (BWP) parameter, a downlink BWP parameter, a third bandwidth parameter for a control resource set (coreset), an interleaving scheme for a downlink control information transmission, a transport block size (TBS) scaling scheme, or any combination thereof.

8. The wireless communication device of claim 2, wherein the at least one initial communication configuration comprises an initial bandwidth for an uplink control transmission.

9. The wireless communication device of claim 8, wherein:
the one or more processors are further configured to execute the processor-executable code and cause the wireless communication device to: select the initial bandwidth for the uplink control transmission based on the first bandwidth used for the PRACH procedure; and
the communication with the other device comprises a transmission of uplink control information using the initial bandwidth for the uplink control information.

10. The wireless communication device of claim 2, wherein the at least one initial communication configuration comprises an initial uplink bandwidth part (BWP) and downlink BWP pair parameter.

11. The wireless communication device of claim 10, wherein:
the one or more processors are further configured to execute the processor-executable code and cause the wireless communication device to: select a second bandwidth for the initial uplink BWP and downlink BWP pair parameter based on the first bandwidth used for the PRACH procedure; and
the communication with the other device comprises a communication using the second bandwidth for the initial uplink BWP and downlink BWP pair parameter.

12. The wireless communication device of claim 2, wherein the at least one initial communication configuration comprises an initial downlink bandwidth part (BWP) parameter.

13. The wireless communication device of claim 12, wherein:
the one or more processors are further configured to execute the processor-executable code and cause the wireless communication device to: select a second bandwidth for the initial downlink BWP parameter based on the first bandwidth used for the PRACH procedure; and
the communication with the other device comprises a reception of downlink information using the second bandwidth for the initial downlink BWP parameter.

14. The wireless communication device of claim 2, wherein the at least one initial communication configuration comprises an initial uplink bandwidth part (BWP) parameter.

15. The wireless communication device of claim 14, wherein:
the one or more processors are further configured to execute the processor-executable code and cause the wireless communication device to: select a second bandwidth for the initial uplink BWP parameter based on the first bandwidth used for the PRACH procedure; and
the communication with the other device comprises a transmission of uplink information using the second bandwidth for the initial uplink BWP parameter.

16. The wireless communication device of claim 2, wherein the at least one initial communication configuration comprises a second bandwidth for a control resource set (coreset) configured by a master information block (MIB).

17. The wireless communication device of claim 16, wherein:
the one or more processors are further configured to execute the processor-executable code and cause the wireless communication device to: select the second bandwidth for the coreset based on the first bandwidth used for the PRACH procedure; and
the communication with the other device comprises a reception of information using the second bandwidth for the coreset configured by the MIB.

18. The wireless communication device of claim 2, wherein the at least one initial communication configuration indicates whether interleaving is to be used for a downlink control information transmission.

19. The wireless communication device of claim 18, wherein:
the one or more processors are further configured to execute the processor-executable code and cause the wireless communication device to: determine whether interleaving is used for the downlink control information transmission based on the first bandwidth used for the PRACH procedure; and
the communication with the other device comprises a reception of downlink information according to the determination of whether the interleaving is used.

20. The wireless communication device of claim 2, wherein the at least one initial communication configuration comprises a transport block size (TBS) scaling scheme.

21. The wireless communication device of claim 20, wherein:
the one or more processors are further configured to execute the processor-executable code and cause the wireless communication device to: select a TBS scaling value based on the first bandwidth used for the PRACH procedure; and the communication with the other device comprises a communication of information according to the TBS scaling value.

22. The wireless communication device of claim 2, wherein:

the other device is a network entity;

the one or more processors are further configured to execute the processor-executable code and cause the wireless communication device to receive a set of configurations from the network entity; and the one or more processors are further configured to execute the processor-executable code and cause the wireless communication device to select, based on the first bandwidth used for the PRACH procedure, the at least one initial communication configuration from the set of configurations.

23. The wireless communication device of claim 2, wherein the one or more processors are further configured to execute the processor-executable code and cause the wireless communication device to:

determine that a maximum transmit power for a PRACH transmission within one sub-band has been reached; and after the determination that the maximum transmit power for the PRACH transmission within one sub-band has been reached, concurrently send a first PRACH sequence on a first sub-band and a second PRACH sequence on a second sub-band.

24. The wireless communication device of claim 2, wherein the one or more processors are further configured to execute the processor-executable code and cause the wireless communication device to:

determine that a response to a PRACH transmission that was sent on one sub-band was not received; and after the determination that the response to the PRACH transmission that was sent on one sub-band was not received, concurrently send a first PRACH sequence on a first sub-band and a second PRACH sequence on a second sub-band.

25. The wireless communication device of claim 2, wherein the one or more processors are further configured to execute the processor-executable code and cause the wireless communication device to:

determine that a response to a PRACH transmission that was sent on two sub-bands was not received; and after the determination that the response to the PRACH transmission that was sent on two sub-bands was not received, concurrently send a first PRACH sequence on a first sub-band, a second PRACH sequence on a second sub-band, a third PRACH sequence on a third sub-band, and a fourth PRACH sequence on a fourth sub-band.

26. The wireless communication device of claim 2, wherein:

the at least one initial communication configuration comprises a first configuration and a second configuration; and the one or more processors are further configured to execute the processor-executable code and cause the wireless communication device to:

select the first configuration after a determination that the first bandwidth used for the PRACH procedure is one sub-band; or select the second configuration after a determination that the first bandwidth used for the PRACH procedure is two sub-bands.

27. The wireless communication device of claim 2, wherein:

the at least one initial communication configuration comprises a first configuration, a second configuration, and a third configuration; and the one or more processors are further configured to execute the processor-executable code and cause the wireless communication device to:

select the first configuration after a determination that the first bandwidth used for the PRACH procedure is one sub-band;

select the second configuration after a determination that the first bandwidth used for the PRACH procedure is two sub-bands; or select the third configuration after a determination that the first bandwidth used for the PRACH procedure is four sub-bands.

28. A method of communication at a network entity, the method comprising:

transmitting, to a wireless communication device, a mapping of different physical random access channel (PRACH) bandwidths to different communication configurations;

receiving at least one PRACH sequence from the wireless communication device;

identifying a first bandwidth used for receiving the at least one PRACH sequence;

selecting at least one initial communication configuration based on the first bandwidth used for receiving the at least one PRACH sequence and based on the mapping of different PRACH bandwidths to different communication configurations; and communicating with the wireless communication device, wherein the communicating uses the at least one initial communication configuration.

29. A network entity, comprising:

a transceiver;

one or more memories that store processor-executable code; and one or more processors configured to execute the processor-executable code and cause the network entity to:

transmit, to a wireless communication device, a mapping of different physical random access channel (PRACH) bandwidths to different communication configurations;

receive at least one PRACH sequence from the wireless communication device via the transceiver;

identify a first bandwidth used for the reception of the at least one PRACH sequence;

select at least one initial communication configuration based on the first bandwidth used for receiving the reception of the at least one PRACH sequence and based on the mapping of different PRACH bandwidths to different communication configurations; and communicate with the wireless communication device via the transceiver, wherein the communication with the wireless communication device uses the at least one initial communication configuration.

30. The network entity of claim 29, wherein:

the at least one initial communication configuration comprises an initial bandwidth for an uplink control transmission;

the one or more processors are further configured to execute the processor-executable code and cause the network entity to: determine the initial bandwidth for the uplink control transmission based on the first bandwidth used for the reception of the at least one PRACH sequence; and the communication with the wireless communication device comprises a reception of uplink control information using the initial bandwidth for the uplink control information.

31. The network entity of claim 29, wherein:

the at least one initial communication configuration comprises an initial uplink bandwidth part (BWP) and downlink BWP pair parameter; and the one or more processors are further configured to execute the processor-executable code and cause the network entity to: determine a second bandwidth for the initial uplink BWP and downlink BWP pair parameter based on the first bandwidth used for the reception of the at least one PRACH sequence; and the communication with the wireless communication device comprises a communication using the second bandwidth for the initial uplink BWP and downlink BWP pair parameter.

32. The network entity of claim 29, wherein:

the at least one initial communication configuration comprises an initial downlink bandwidth part (BWP) parameter;

the one or more processors are further configured to execute the processor-executable code and cause the network entity to: determine a second bandwidth for the initial downlink BWP parameter based on the first bandwidth used for the reception of the at least one PRACH sequence; and the communication with the wireless communication device comprises a transmission of downlink information using the second bandwidth for the initial downlink BWP parameter.

33. The network entity of claim 29, wherein:

the at least one initial communication configuration comprises an initial uplink bandwidth part (BWP) parameter;

the one or more processors are further configured to execute the processor-executable code and cause the network entity to: determine a second bandwidth for the initial uplink BWP parameter based on the first bandwidth used for the reception of the at least one PRACH sequence; and the communication with the wireless communication device comprises a reception of uplink information using the second bandwidth for the initial uplink BWP parameter.

34. The network entity of claim 29, wherein:

the at least one initial communication configuration comprises a second bandwidth for a control resource set (coreset) configured by a master information block (MIB);

the one or more processors are further configured to execute the processor-executable code and cause the network entity to: determine the second bandwidth for the coreset based on the first bandwidth used for the reception of the at least one PRACH sequence; and the communication with the wireless communication device comprises a transmission of information using the second bandwidth for the coreset configured by the MIB.

35. The network entity of claim 29, wherein:

the at least one initial communication configuration comprises a transport block size (TBS) scaling scheme;

the one or more processors are further configured to execute the processor-executable code and cause the network entity to: determine a TBS scaling value based on the first bandwidth used for the reception of the at least one PRACH sequence; and the communication with the wireless communication device comprises a communication of information according to the TBS scaling value.

36. The base station network entity of claim 29, wherein:

the one or more processors are further configured to execute the processor-executable code and cause the network entity to:

send a set of configurations to the wireless communication device; and the selection of the at least one initial communication configuration comprises a selection, based on the first bandwidth used for the reception of the at least one PRACH sequence, of the at least one initial communication configuration from the set of configurations.

* * * * *